US011897193B2

(12) United States Patent
Anthony et al.

(10) Patent No.: US 11,897,193 B2
(45) Date of Patent: Feb. 13, 2024

(54) BUILD MATERIAL SLURRY

(71) Applicant: HEWLETT-PACKARD DEVELOPMENT COMPANY, L.P., Spring, TX (US)

(72) Inventors: Thomas Anthony, Palo Alto, CA (US); Lihua Zhao, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 106 days.

(21) Appl. No.: 16/488,956

(22) PCT Filed: Oct. 24, 2017

(86) PCT No.: PCT/US2017/058152
§ 371 (c)(1),
(2) Date: Aug. 27, 2019

(87) PCT Pub. No.: WO2019/083515
PCT Pub. Date: May 2, 2019

(65) Prior Publication Data
US 2020/0246865 A1 Aug. 6, 2020

(51) Int. Cl.
*B29C 64/165* (2017.01)
*B33Y 10/00* (2015.01)
(Continued)

(52) U.S. Cl.
CPC .............. *B29C 64/165* (2017.08); *B22F 1/10* (2022.01); *B22F 3/1021* (2013.01); *B22F 10/14* (2021.01);
(Continued)

(58) Field of Classification Search
CPC ...... B22F 1/0059; B22F 3/1021; B22F 10/10; B22F 10/20; B33Y 10/00; B33Y 70/10; B33Y 70/00; B29C 64/165
See application file for complete search history.

(56) References Cited

U.S. PATENT DOCUMENTS 5,387,380 A * 2/1995 Cima ..................... B33Y 10/00
264/109
5,848,351 A * 12/1998 Hoshino ............... H01M 4/742
428/550
(Continued)

FOREIGN PATENT DOCUMENTS

CN 106270512 A 1/2017
KR 20160128236 A * 11/2016
(Continued)

OTHER PUBLICATIONS

Gizowska, M. et al., Properties of Waterbased Slurries for Fabrication of Ceramicmetal Composites by Slip Casting Method, 2001s.
(Continued)

*Primary Examiner* — Nicholas A Wang
*Assistant Examiner* — Maxwell Xavier Duffy
(74) *Attorney, Agent, or Firm* — Dierker & Kavanaugh, P.C.

(57) ABSTRACT

An example of a build material slurry includes metallic particles having an individual particle size up to 20 μm, from about 0.01 wt % up to 1 wt % of a water-soluble binder, based on a weight of the metallic particles, and water. The build material slurry is a ready-to-use three-dimensional (3D) printing build material.

9 Claims, 5 Drawing Sheets

(51) Int. Cl.

| | | |
|---|---|---|
| *B33Y 70/10* | (2020.01) | |
| *B22F 3/10* | (2006.01) | |
| *B22F 1/10* | (2022.01) | |
| *B22F 10/14* | (2021.01) | |
| *B22F 10/16* | (2021.01) | |
| *B22F 12/67* | (2021.01) | |
| *B22F 12/10* | (2021.01) | |
| *B22F 12/41* | (2021.01) | |
| *B22F 12/42* | (2021.01) | |
| *B22F 12/50* | (2021.01) | |
| *B22F 12/63* | (2021.01) | |
| *B22F 12/90* | (2021.01) | |
| *B22F 10/36* | (2021.01) | |

(52) U.S. Cl.
CPC .............. *B22F 10/16* (2021.01); *B22F 12/67* (2021.01); *B33Y 10/00* (2014.12); *B33Y 70/10* (2020.01); *B22F 10/36* (2021.01); *B22F 12/10* (2021.01); *B22F 12/41* (2021.01); *B22F 12/42* (2021.01); *B22F 12/50* (2021.01); *B22F 12/63* (2021.01); *B22F 12/90* (2021.01)

(56) References Cited

U.S. PATENT DOCUMENTS

| | | |
|---|---|---|
| 7,108,733 B2 | 9/2006 | Enokido |
| 2016/0136728 A1 | 5/2016 | Srivas et al. |
| 2016/0236372 A1* | 8/2016 | Benichou ............... B33Y 10/00 |
| 2017/0008082 A1 | 1/2017 | Chen |
| 2021/0354365 A1* | 11/2021 | Kritchman ............. B33Y 30/00 |

FOREIGN PATENT DOCUMENTS

| | | | |
|---|---|---|---|
| WO | WO-2015056230 A1 * | 4/2015 | ............ B22F 10/00 |
| WO | WO-2017059866 | 4/2017 | |
| WO | WO-2017086995 | 5/2017 | |
| WO | WO-2017095416 | 6/2017 | |
| WO | WO-2017180118 | 10/2017 | |

OTHER PUBLICATIONS

Kernan, B.D. et al., Three-Dimensional Printing of Tungsten Carbide-10 Wt% Cobalt Using a Cobalt Oxide Precursor, Jan. 2007.

Molitch-Hou, M., Admatec Introduces , DLP Metal 3D Printing to the Market, Apr. 26, 2017.

Studnitzky, T., 3D Screen Printing Mass Production of Metals and Ceramics.

* cited by examiner

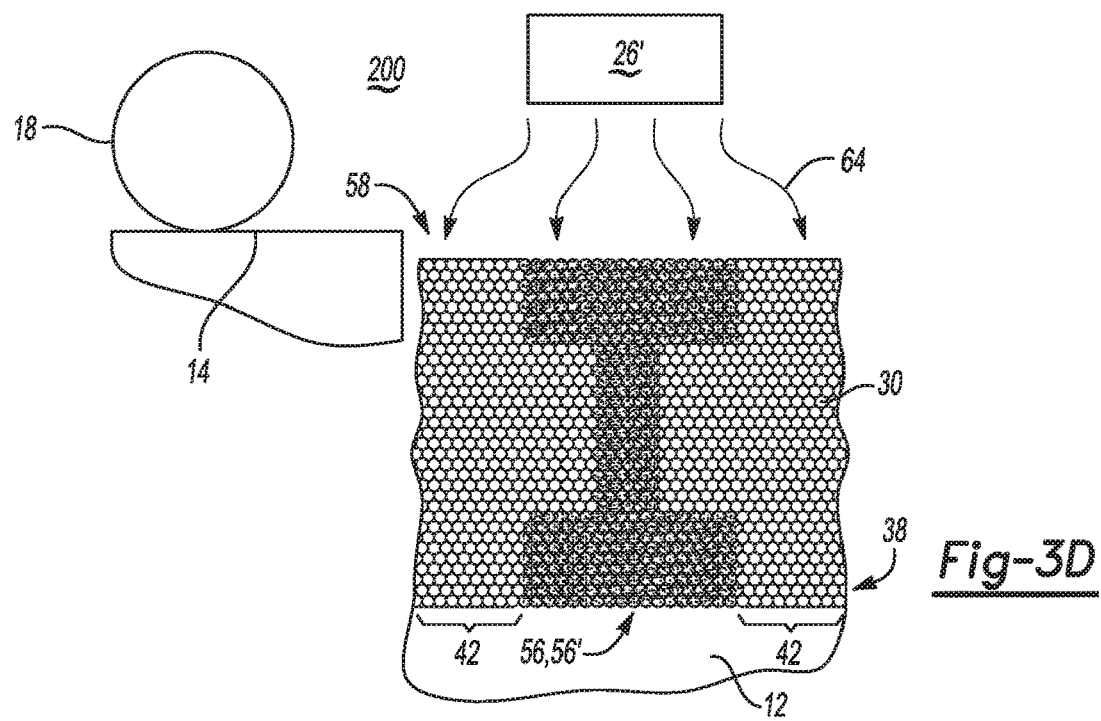
*Fig-3D*
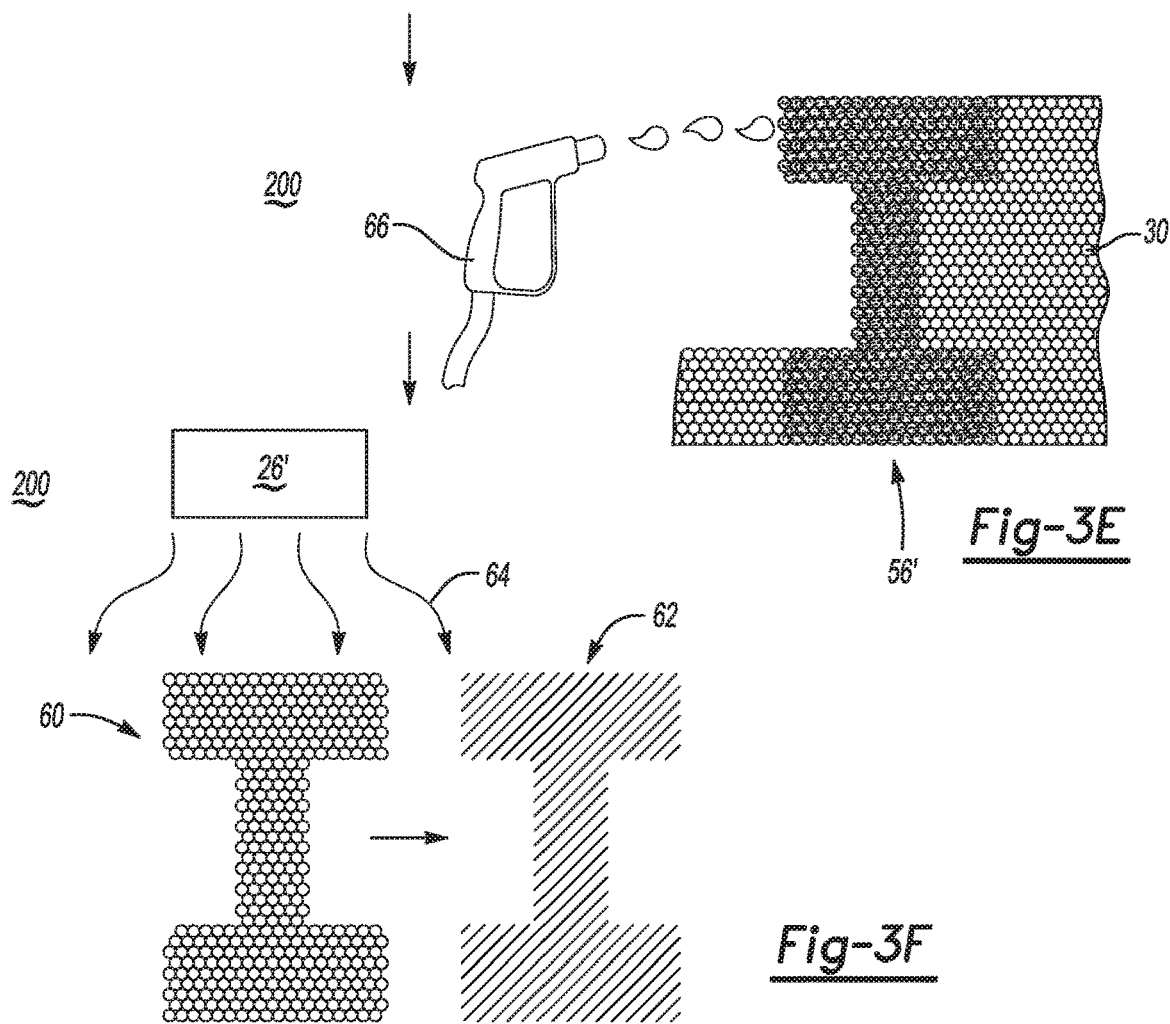
*Fig-3E*
*Fig-3F*

BUILD MATERIAL SLURRY

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A through 3F are schematic and partially cross-sectional views depicting the formation of a 3D part using an example of a method for 3D printing disclosed herein;

DETAILED DESCRIPTION

Figure 1:
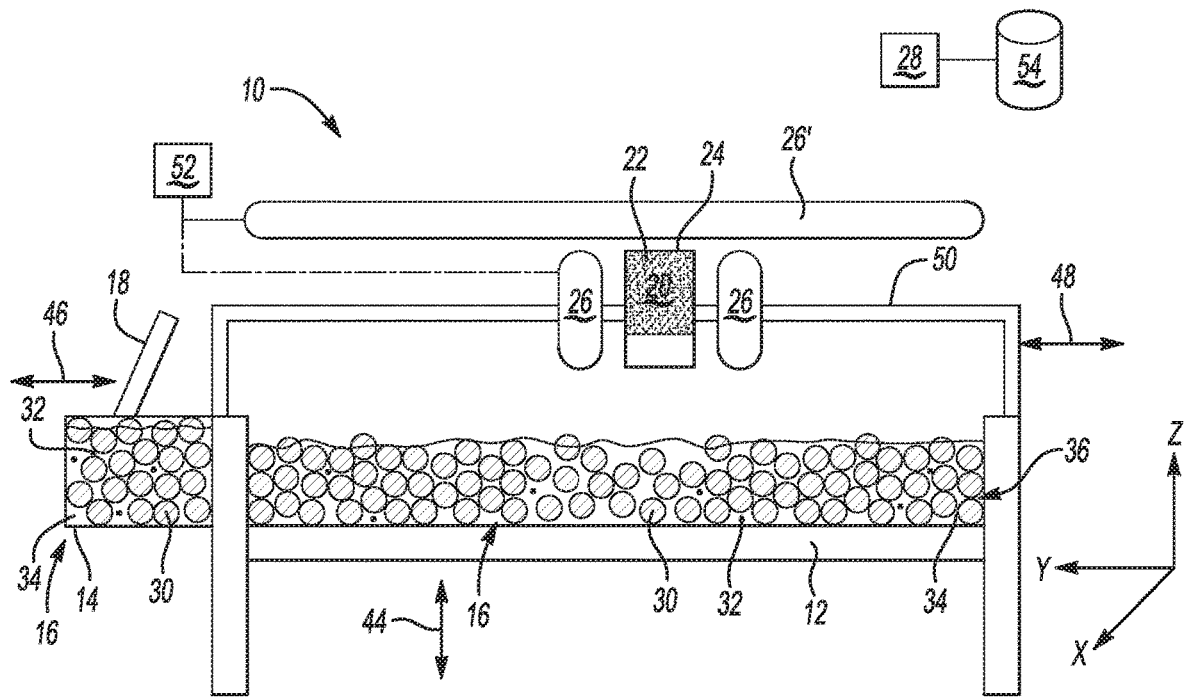
FIG. 1 is a schematic and partially cross-sectional view of an example of a 3D printing system disclosed herein.

In examples of a method for three-dimensional (3D) printing disclosed herein, a build material layer is formed by applying a build material slurry including metallic particles, a water-soluble binder, and water, and evaporating at least some of the water from the slurry. At least partial removal of the water enables the remaining water-soluble binder to form organic or inorganic bridges between the metallic particles. These bridges provide some degree of interparticle binding that holds the metallic particles in place within the build material layer during patterning of the layer and during subsequent formation of additional layers. A patterning fluid containing a water-insoluble binder is then selectively applied on at least a portion of the build material layer. Another build material layer can then be formed on the patterned build material layer by applying additional build material slurry and evaporating at least some of the water therefrom. The patterning fluid may be applied to this other build material layer, and these processes may be repeated to form an intermediate part (also referred to as a green part or a green body) of the 3D part that is ultimately to be formed. The intermediate part may then be exposed to electromagnetic radiation and/or heat to sinter the metallic particles in the intermediate part to form the final 3D printed part.

As used herein, the term "patterned intermediate part" (also known as a patterned green part) refers to a part precursor that has a shape representative of the final 3D printed part and that includes metallic particles patterned with the patterning fluid. In the patterned intermediate part, the metallic particles may or may not be weakly bound together by the water soluble binder of the slurry, one or more components of the patterning fluid, and/or by attractive force(s) between the metallic particles and the patterning fluid. In some instances, the mechanical strength of the patterned intermediate part is such that it cannot be handled or extracted from a build material platform. Moreover, it is to be understood that any metallic particle that is not patterned with the patterning fluid is not considered to be part of the patterned intermediate part, even if it is adjacent to or surrounds the patterned intermediate part.

As used herein, the term "cured intermediate part" (also known as a cured green part) refers to a patterned intermediate part in which the water-insoluble binder of the patterning fluid has been activated so that it forms a glue that coats the metallic particles and creates or strengthens the bond between the metallic particles. In other words, the "cured intermediate part" is a part precursor with a shape representative of the final 3D printed part and that includes metallic particles bound together by at least substantially cured water-insoluble binder particles of the patterning fluid (with which the build material layer was patterned). Compared to the patterned intermediate part, the mechanical strength of the cured intermediate part is greater, and in some instances, the cured intermediate part can be handled or extracted from the build material platform.

It is to be understood that the term "green" when referring to the patterned green part or the cured green part does not connote color, but rather indicates that the part is not yet fully processed.

As used herein, the term "at least substantially binder-free part" (also known as an at least substantially binder-free gray part") refers to a cured intermediate part that has been exposed to a heating process that initiates thermal decomposition of some examples of the water-insoluble binder particles so that the water-insoluble binder particles are at least partially removed. In some instances, volatile organic components of or produced by the thermally decomposed water-insoluble binder particles are completely removed and a very small amount of nonvolatile residue from the thermally decomposed binder particles may remain (e.g., <5 wt % of the initial binder may remain). In other instances, the thermally decomposed binder particles (including any products and residues) are completely removed. In other words, the "at least substantially binder-free part" refers to a part precursor with a shape representative of the final 3D printed part and that includes metallic particles bound together as a result of i) weak sintering (i.e., low level necking between the particles, which is able to preserve the part shape), or ii) a small amount of the cured water-insoluble binder particles remaining, or iii) oxygen mediated bonding between metal particles, or iv) Van der Waals forces, and/or v) any combination of i, ii, iii, and/or iv.

It is to be understood that the term "gray" when referring to the at least substantially binder-free gray part does not connote color, but rather indicates that the part is not yet fully processed.

The at least substantially binder-free part may have porosity similar to or greater than the cured intermediate part (due to water-insoluble binder particle removal), but the porosity is at least substantially eliminated during the transition to the 3D printed part.

As used herein the term "sintered part" refers to the final 3D printed part, which has been exposed to a heating process that sinters the metallic particles. In the sintered part, the metallic particles may merge together to form a continuous body.

As mentioned above, in the examples disclosed herein, to form the build material layers and the intermediate part (which is further processed to form the 3D part), the build material slurry is used. The use of the build material slurry to form the build material layers may reduce or eliminate airborne build material particles. Airborne build material particles may be generated when build material particles are applied as dry powders, and may cause maintenance issues for the printing system (e.g., by clogging print nozzles). In contrast, the water of the build material slurry disclosed herein may surround the metallic particles and keep them in the slurry during dispensing/application. Moreover, as water evaporates from the dispensed/applied slurry, the water-soluble binder may bind the metallic particles together and prevent them from being displaced (e.g., from becoming airborne due to impact from the patterning fluid, from splashing, etc.) from the build material layer during patterning and/or subsequent build material layer formation.

Applying build material as a dry powder may also limit the particle size distribution and/or the particle size of the build material particles. Build material having a large particle size distribution tends to form irregularly-shaped clumps due to the size difference among the particles, thereby restricting the ability of the powder to be spread into a uniform layer. Particle distributions that contain particles with a particle size less than about 5 µm and a maximum particle size between 30 µm and 100 µm are likely to clump. Additionally, build material particle size distributions that have maximum particle size less than about 20 µm tend to form irregularly-shaped clumps due to strong Van Der Waals attraction between the particles. Clumping decreases the ability of the build material to be spread into thin layers, and can lead to 3D parts having imprecise shapes, varying structural properties, structural defects and/or varying visual qualities.

The build material slurry disclosed herein enables a variety of different particle size distributions and/or particles sizes to be spread into thin layers with well controlled uniformity. As examples, the slurry may contain metallic particles that have a large particle size distribution and/or that are less than 20 µm in size. In some examples, it may be desirable to use metallic particles that have a large particle size distribution (e.g., metal injection molding (MIM) powders), as such particles may be less expensive than metallic particles with a small particle size distribution. In other examples, it may be desirable to use metallic particles that are less than 20 µm in size when making high density, sintered parts. Meanwhile, smaller metal particles may involve lower sintering temperatures (than larger particles), shorter sintering times, etc., which may provide energy savings and/or cost savings.

Application of build material by a slurry also allows the use of non-spherical powders. Such powders are less expensive to produce and may consolidate into a more densely packed arrangement upon drying than a distribution of spherical powders. Dense packing of metallic build material particles in the printed part facilitates sintering by reducing the porosity volume that has to be removed during sintering. Non-spherical powders cannot be spread into thin layers when dry. Incorporating them into a slurry eliminates this challenge.

Build materials, especially metallic build materials, with a larger particle size may introduce such processing challenges when making high density, sintered parts. In order to achieve a high density part with larger metallic particles, process conditions are tightly controlled, which can make the process inefficient and/or difficult. This may be due, in part, to the fact that metallic particles tend to have very high melting temperatures (e.g., greater than 600° C., and in many cases more than 1000° C.), and that a higher target sintered density corresponds to maintaining a precise sintering temperature that is close to the melting temperature of the metallic particles. Forming metallic parts with a high density (e.g., greater than 90% of theoretical density) using larger metal particles (e.g., having a particle size of or greater than 30 µm) may involve maintaining the sintering temperature, which may be greater than 1000° C., with a precision of ±1° C. for several hours.

Sintering larger metallic particles to achieve high density parts also tends to include sintering for longer sintering time periods. Sintering is a diffusion based process, and therefore, the sintering speed is dependent on the particle size. For the majority of metallic materials, the sintering rate is inversely proportional to the material particle diameter in a power ranging from 2 to 4. Thus, a decrease in build material particle diameter from 30 µm to 3 µm should accelerate its sintering rate by a factor of $10^2$ to $10^4$. A faster sintering time may produce a metallic part with a smaller grain size and better mechanical properties. As such, it may be desirable to have a shorter sintering time.

In some examples, the build material slurry includes metallic particles, a water-soluble binder, and water. In these examples, the build material slurry may include additional components. An example of an additional component that may be included in the build material slurry includes an additive selected from the group consisting of a surfactant, a defoaming agent, and a combination thereof.

In other examples, the build material slurry consists of the metallic particles, the water-soluble binder, and water. In these examples, the build material slurry includes no other components.

In still other examples, the build material slurry consists of the metallic particles, the water-soluble binder, the additive selected from the group consisting of the surfactant, the defoaming agent, and the combination thereof, and water. In these examples, the build material slurry includes no other components.

In yet other examples, the build material slurry comprises: metallic particles having an individual particle size up to 20 µm; from about 0.01 wt % up to 1 wt % of a water-soluble binder, based on a weight of the metallic particles; and water; wherein the build material slurry is a ready-to-use three-dimensional (3D) printing build material. In these examples, the build material slurry may include additional components (e.g., the additive).

As mentioned above, the build material slurry includes the metallic particles. The metallic particles may be any particulate metallic material. In an example, the metallic particles may have the ability to sinter into a continuous body to form the sintered part when heated to the sintering temperature. By "continuous body," it is meant that the metallic particles are merged together to form a single part with sufficient mechanical strength to meet the requirements of the desired final 3D part.

It is to be understood that the sintering temperature may vary, depending, in part, upon the alloy composition and phase(s) of the metallic particles. For example, stainless steel alloys have sintering temperatures ranging from 1000° C. to 1450° C., whereas the range for aluminum alloys is from about 450° C. to 650° C.

In an example, the metallic particles are a single phase metallic material composed of one element. In this example, the sintering temperature may be below the melting point of the single element.

In another example, the metallic particles are composed of two or more elements, which may be in the form of a single phase metallic alloy or a multiple phase metallic alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic particles are composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be desirable when using larger metallic particles and/or to achieve high density. It is to be understood that the sintering temperature may be high enough to provide sufficient energy to allow atom mobility between adjacent particles.

The metallic particles may be composed of a single elements or alloys. Some examples of the metallic particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloys may be used.

Any metallic particles may be used that are in powder form prior to being incorporated into the build material slurry. As an example, metal injection molding (MIM) powders may be used as the metallic particles.

The melting point, solidus temperature, eutectic temperature, and/or peritectic temperature of the metallic particles are above the temperature of the environment in which the patterning portion of the 3D printing method is performed (e.g., above 100° C.). In some examples, the metallic particles may have a melting point ranging from about 850° C. to about 3500° C. In other examples, the metallic particles may be an alloy having a range of melting points.

The metallic particles may be similarly sized particles or differently sized particles. The individual particle size of each of the metallic particles is up to 20 μm. In an example, the metallic particles may be nanoparticles, having a particle size ranging from about 10 nm to less than 1000 nm. In another example, the individual particle size of the metallic particles ranges from about 1 μm to about 20 μm. In still another example, the individual particle size of the metallic particles ranges from greater than 3 μm to about 20 μm. In yet another example, the individual particle size of the metallic particles ranges from about 10 μm to about 15 μm. In yet another example, the individual particle size of the metallic particles ranges from about 3.25 μm to about 5 μm. In yet another example, the individual particle size of the metallic particles is about 10 μm. As used herein, the term "individual particle size" refers to the particle size of each individual metallic particle. As such, when the metallic particles have an individual particle size ranging from about 10 nm to about 20 μm, the particle size of each individual metallic particle is within the disclosed range, although individual metallic particles may have particle sizes that are different than the particle size of other individual metallic particles. The particle size of the metallic particles generally refers to the diameter or average diameter of the metallic particle, which may vary, depending upon the morphology of the particle.

The metallic particles may also be non-spherical, spherical, random shapes, or combinations thereof.

In an example, the metallic particles are present in an amount ranging from about 50 wt % to about 97 wt %, based on the total weight of the build material slurry. In another example, the amount of the metallic particles present in the build material slurry is about 90 wt %, based on the total weight of the build material slurry. The weight percent of metallic particles in the slurry is a function of the density of the build material. For example, a slurry of stainless steel particles (density=8.0 g/cc, i.e., 8.0 g/cm$^3$) may have build material particles making up 90 wt % of the slurry, whereas an equivalent slurry of aluminum particles (density=2.7 g/cc) would contain 75 wt % of metal build material particles.

As mentioned above, the build material slurry also includes the water-soluble binder. The water-soluble binder is capable of binding the metallic particles upon the evaporation of at least some of the water, so that the particles do not move from or within the build material layer. By binding the metallic particles upon evaporation of at least some of the water, the water-soluble binder prevents the metallic particles from becoming airborne after the water evaporates from around them. By binding the metallic particles, the water-soluble binder also prevents the dissolution or disruption of unpatterned portions of build material layers as the intermediate part is built. When additional slurry is applied to a build material layer, the water-soluble binder keeps the metallic particles in any unpatterned portions of the layer from being splashed, displaced, or moved by, or from being incorporated into, the liquid of the newly applied slurry. Additionally, the binding of the metallic particles by the water-soluble binder may prevent the movement of the metallic particles (which may otherwise affect the precision and quality of the 3D part that is formed) when the patterning fluid is applied on at least a portion of the build material layers.

The water-soluble binder may be any material that i) has enough adhesive strength to hold the metallic particles in the build material layers after at least partial water evaporation, and ii) is soluble in water. In an example, the water-soluble binder has a solubility in water of at least 1 wt %. In some instances, the water-soluble binder may have a high enough solubility that the water-soluble binder may be fully dissolved in the build material slurry. The solubility of the water-soluble binder in water may help to maintain the viscosity of the slurry so that the slurry can readily be spread into a slurry layer and impede sedimentation of the metal particles in the slurry tank, and once at least some of the water evaporates from the slurry layer, the water-soluble binder is able to hold the metallic particles together to form a build material layer. It is to be understood that there is no upper limit on the water-soluble binder's solubility in water, and the higher the solubility, the better.

Examples of the water-soluble binder include polyacrylates, sugars, starches, sugar alcohols, polymeric or oligomeric sugars, polycarboxylic acids, polysulfonic acids, water-soluble polymers containing carboxylic or sulfonic moieties, polyvinyl alcohol (PVA), polyethers, polyvinylpyrrolidone, polyether alkoxy silane, and combinations thereof. Other examples include polyethylene glycol, polyethylene oxide, polyamines, polyethyleneimines, and polyamidoamines. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), polyethylene glycol and/or a co-polymer thereof, polypropylene glycol and/or a co-polymer thereof, or CARBOSPERSE® K7028 (a low molecular weight acrylic acid polymer, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used, however the dissolution kinetics may be slower. Inorganic, water-soluble binders, such as metal salts may also be used. Examples include copper nitrate, iron nitrate, cobalt nitrate, iron acetate, magnesium acetate, copper sulfate, nickel sulfate, aluminum sulfate, and manganese sulfate. It is to be understood that these types of salts may be used as the water-soluble binder when the selected water-insoluble binder has a curing or activation process that will not decompose or otherwise degrade the inorganic, water-soluble binder. For example, an inorganic, water-soluble binder may be paired with a UV curable water-insoluble binder because the UV curing process will not transform the inorganic, water-soluble binder into a water-insoluble product. For another example, an inorganic, water-soluble binder may be paired with nanoparticles as the water-insoluble binder as long as the curing/activation process of the nanoparticles will not transform the inorganic, water-soluble binder into a water-insoluble product. In the examples disclosed herein, metal salts would not be used as both the water-soluble binder and the water-insoluble binder.

While several example water-soluble binders have been described, in an example of the build material slurry, the water-soluble binder may be polyvinyl alcohol. In another example of the build material slurry, the water-soluble binder may be selected from the group consisting of polyvinyl alcohol, polyethylene glycol, polyethylene oxide, polyvinylpyrrolidone, polyamines, polyethyleneimines, polyacrylates, polyamidoamines, and combinations thereof.

The water-soluble binder is included in an amount sufficient to bind the metallic particles upon the evaporation of at least some water from the slurry layer, and insufficient to cause the dissolution of part or all of the cured intermediate part during an extraction process. If too little water-soluble binder is included in the build material slurry, the water-soluble binder will be unable to prevent the metallic particles from moving from and/or within and/or between the build material layers. If too much water-soluble binder is included in the build material slurry, the water-soluble binder may affect the mechanical strength and/or shape of the cured intermediate part when the cured intermediate part is removed from the build material cake.

In an example, the water-soluble binder is present in the build material slurry in an amount ranging from about 0.01 wt % up to 1 wt %, based on the weight of the metallic particles. In another example, from about 0.02 wt % up to 0.5 wt % of the water-soluble binder is present in the build material slurry, based on the weight of the metallic particles. The weight percent of the water-soluble binder may vary depending, in part, upon the density of the metallic particles. For metallic particles with a lower density (e.g., aluminum, density 2.7 g/cc), less water-soluble binder may be included, and for metallic particles with a higher density (e.g., gold, 19.3 g/cc), more water-soluble binder may be included. In still another example, the water-soluble binder is present in the build material slurry in an amount ranging from about 0.05 wt % to about 1.5 wt %, based on the total weight of the build material slurry.

In an example, the build material slurry further includes an additive selected from the group consisting of a surfactant, a defoaming agent, and a combination thereof. In an example, the total amount of the additive(s) present in the build material slurry ranges from about 0.0003 wt % to about 0.5 wt %, based on the total weight of the slurry.

A surfactant may be included in the build material slurry to control the viscosity, to improve the lubricity, and to prevent agglomeration of the metallic particles. Examples of suitable surfactants that may be included in the slurry include a low molecular weight acrylic acid polymer (CARBOSPERSE® K7028, available from Lubrizol), a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc. or CARBOWET® GA-211 from Evonik, previously known as SURFYNOL® CT-111). Still other suitable surfactants include water-soluble, non-ionic surfactants (e.g., TERGITOL™ TMN-6 or TERGITOL™ 15-S-9 (a secondary alcohol ethoxylate) from The Dow Chemical Company). One further example includes anionic surfactants such as DOWFAX® 2A1 from The Dow Chemical Company.

Whether a single surfactant is used or a combination of surfactants is used, the total amount of surfactant(s) in the build material slurry may range from about 0.001 wt % to about 0.1 wt %, based on the total weight of the build material slurry.

The build material slurry may also include a defoamer. Examples of suitable defoamers include oils and high molecular weight alcohols. Oil defoaming agents include aliphatic hydrocarbon oil (e.g., ISOPAR™ V available from Exxon Mobile), silicone oil, and mineral oil (e.g., PURETOL™ 22 available from Petro-Canada). Examples of high molecular weight (e.g., ≥130 g/mol) alcohols are decanol, dodecanol, undecanol, and octanol. Other examples of suitable defoamers include molecular defoamers, such as ethoxylated wetting agents and molecular defoamers (e.g., SURFYNOL® 420 from Air Products and Chemical Inc.) or non-ionic wetting agents and molecular defoamers (e.g., SURFYNOL® 104E from Air Products and Chemical Inc.).

The defoamer(s) may be present in the build material slurry in an amount ranging from about 0.001 wt % to about 0.01 wt % of the total weight of the based on the total weight of the build material slurry.

In the examples described herein, the balance of the build material slurry is water. As an example, deionized water may be used. It is to be understood that another liquid carrier may be used in the slurry instead of water. Other liquid carriers may be used to speed up the evaporation process, and thus reduce the process time. Some examples of other liquid carriers for the slurry may include high vapor pressure solvents, such as isopropanol or acetone. These high vapor pressure solvents can be condensed and captured for recycling in the printing system 10.

The balance of water or other liquid carrier may account for from about 5 wt % to about 25 wt % of the total weight of the build material slurry. In another example the water content ranges from about 8 wt % to about 12 wt %. The amount of water in the build material slurry should be just enough to enable the build material slurry to be spread on a build area platform or a previously formed and patterned build material layer. If too little water is included in the build material slurry, the build material slurry may not be easily spreadable. If too much water is included in the build material slurry, the metallic particles may settle to the bottom of the slurry container prior to spreading. Control of metallic particle content in the spread slurry can be rendered more difficult if particle settling occurs prior to or during application of the slurry to the build area platform or previously formed build material layer.

In an example, the build material slurry is devoid of a water-insoluble binder. The build material slurry may be devoid of a water-insoluble binder because the presence of a water-insoluble binder may make it difficult to separate the unpatterned portions of the build material layers from the cured intermediate part. As used herein, the term "devoid of" when referring to a component (such as, e.g., a water-insoluble binder, etc.) may refer to a composition that does not include any added amount of the component, but may contain residual amounts, such as in the form of impurities. The components may be present in trace amounts, and in one aspect, in an amount of less than 0.1 weight percent (wt %) based on the total weight of the composition (e.g., build material slurry), even though the composition is described as being "devoid of" the component. In other words, "devoid of" of a component may mean devoid of added component but allows for trace amounts or impurities inherently present in certain ingredients.

The build material slurry is a ready-to-use 3D build material. As used herein "a ready-to-use 3D build material," refers to a composition that can be or is to be used in 3D printing as a build material without any further processing. In other words, a ready-to-use 3D build material may be applied to a build area platform or a previously formed and patterned build material layer without undergoing any processing first.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

In an example, the three-dimensional (3D) printing system 10 generally includes a supply 14 of a build material slurry 16 including: metallic particles 30; a water-soluble binder 32; and water 34; a build material distributor 18; a supply of a patterning fluid 20 including a water-insoluble binder 22; an inkjet applicator 24 for selectively dispensing the patterning fluid 20; a source 26, 26' (of heat and/or radiation); a controller 28; and a non-transitory computer readable medium having stored thereon computer executable instructions to cause the controller 28 to process data and in response: to control the build material supply 14 and the build material distributor 18 to apply the build material slurry 16 to form a slurry layer 36; to control the heat and/or radiation source 26, 26' to allow or cause evaporation of at least some water 34 from the slurry layer 36 to form a build material layer 38 (see FIG. 3A); to control the inkjet applicator 24 to selectively apply the patterning fluid 20 on at least a portion 40 (see, e.g., FIG. 3B) of the build material layer 38.

As shown in FIG. 1, the printing system 10 includes the build area platform 12, the build material supply 14 containing the build material slurry 16, and the build material distributor 18.

The build area platform 12 receives the build material slurry 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 44, e.g., along the z-axis, so that the build material slurry 16 may be delivered to the platform 12 or to a previously patterned layer of the patterned intermediate part 56 (see, e.g., FIG. 3D). In an example, when the build material slurry 16 is to be delivered, the build area platform 12 may be programmed to advance (e.g., downward) enough so that the build material distributor 18 can push the build material slurry 16 onto the platform 12 to form a slurry layer 36 of the build material slurry 16 thereon. The build area platform 12 may also be returned to its original position, for example, when a new intermediate part 56, 56' is to be built.

The build material supply 14 may be a container, bed, or other surface that is to position the build material slurry 16 between the build material distributor 18 and the build area platform 12. In some examples, the build material supply 14 may include a surface upon which the build material slurry 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material slurry 16 from a storage location to a position to be spread onto the build area platform 12 or onto a previously patterned layer of the patterned intermediate part 56.

The build material slurry 16 in the build material supply 14 may be mixed, stirred, pumped or otherwise agitated to ensure that the slurry 16 composition remains at least substantially uniform throughout the build material slurry volume.

The build material distributor 18 may be moved in a direction as denoted by the arrow 46, e.g., along the y-axis, over the build material supply 14 and across the build area platform 12 to spread a slurry layer 36 of the build material slurry 16 over the build area platform 12. The build material distributor 18 may also be returned to a position adjacent to the build material supply 14 following the spreading of the build material slurry 16. The build material distributor 18 may be a blade (e.g., a doctor blade), a roller, a combination of a roller and a blade, and/or any other device capable of spreading the build material slurry 16 over the build area platform 12. For instance, the build material distributor 18 may be a counter-rotating roller. In other examples, the build material distributor 18 may be selected from the group consisting of a doctor blade, a slot die coater, a rod coater, a blade coater, a fountain curtain coater, or combinations thereof.

In some examples, the build material supply 14 or a portion of the build material supply 14 may translate along with the build material distributor 18 such that build material slurry 16 is delivered continuously to the material distributor 18 rather than being supplied from a single location at the side of the printing system 10 as depicted in FIG. 1. Continuous delivery of build material slurry 16 to the distributor 18 can reduce the time for settling of the metallic particles 30 in the slurry 16 prior to spreading and can prevent premature drying of the slurry supply material. Slot die coaters and fountain curtain coaters are examples of slurry distributors in which the distributor translates across the build area platform 12 as it meters the slurry 16. In some examples, more than one distribution method may be employed to meter the slurry 16. For example, a slot die coater can be used in conjunction with a doctor blade, wherein the slot die coater feeds slurry 16 to the build area platform 12 in advance of a doctor blade that distributes the slurry 16 to create a slurry layer 36 of the desired thickness. A further example is the use of a fountain curtain coater in concert with a doctor blade. In this case, the curtain coater translates ahead of the doctor blade and presents a continuous supply of slurry 16 that is then metered by the trailing doctor blade.

As shown in FIG. 1, the printing system 10 also includes an inkjet applicator 24 for selectively applying the patterning fluid 20. As such, the inkjet applicator 24 includes the patterning fluid 20, includes the water-insoluble binder 22. The composition of the patterning fluid 20 will be discussed further below in reference to FIG. 2 and FIGS. 3A through 3F.

The inkjet applicator 24 may include nozzles, fluid slots, and/or fluidics for dispensing the patterning fluid 20. The inkjet applicator 24 may be a thermal inkjet printhead or print bar, a piezoelectric printhead or print bar, or a continuous inkjet printhead or print bar. While a single inkjet applicator 24 is shown in FIG. 1, it is to be understood that multiple inkjet applicators 24 may be used.

The inkjet applicator 24 may be scanned across the build area platform 12 in the direction indicated by the arrow 48, e.g., along the y-axis. The inkjet applicator 24 may extend a width of the build area platform 12. The inkjet applicator 24 may also be scanned along the x-axis, for instance, in configurations in which the inkjet applicator does not span the width of the build area platform 12 to enable the inkjet applicator 24 to deposit the patterning fluid 20 over a large area of a build material layer 38. The inkjet applicator 24 may thus be attached to a moving XY stage or a translational carriage 50 that moves the inkjet applicator 24 adjacent to the build area platform 12 in order to deposit the patterning fluid 20 in predetermined areas 40 of a build material layer 38 that has been formed on the build area platform 12 in accordance with the method(s) 100, 200 disclosed herein. The inkjet applicator 24 may include a plurality of nozzles (not shown) through which the patterning fluid 20 is to be selectively ejected.

The inkjet applicator 24 may deliver drops of the patterning fluid 20 at a resolution ranging from about 300 dots per inch (DPI) to about 1200 DPI. In other examples, the inkjet applicator 24 may deliver drops of the patterning fluid 20 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the inkjet applicator 24 is able to deliver variable drop volumes of the patterning fluid 20. One example of a suitable printhead has 600 DPI resolution and can delivery drop volumes ranging from about 6 pl to about 14 pl.

As shown in FIG. 1, the printing system 10 may also include the heat and/or radiation source 26, 26'. In some examples, the heat and/or radiation source 26, 26' may be a heater. In other examples, the heat and/or radiation source 26, 26' may be a source of electromagnetic radiation. In an example, evaporation of the water 34 of the slurry layer 36 is accomplished by heating the slurry layer 36 by the heat and/or radiation source 26, 26'. In another example, when the water-insoluble binder 22 is to be activated by heat, the heat and/or radiation source 26, 26' may be used to supply suitable thermal energy. In some examples, the heat and/or radiation source 26, 26' may be a conductive heater or a radiative heater (e.g., infrared lamps) that is part of the printing system 10. In these examples, the heat and/or radiation source 26, 26' of the printing system 10 may be used to heat an entire build material cake 58 (see, e.g., FIG. 3D) after the patterning is finished. These types of heat and/or radiation sources 26' may be placed below the build area platform 12 (e.g., conductive heating from below the platform 12) and/or along the sides of the build volume or may be placed above the build area platform 12 (e.g., radiative heating of the build material layer surface).

The additional heating processes, e.g., sintering or de-binding and sintering, may take place in a heater that is separate from the printing system 10. Examples of the separate heater include a conventional furnace or oven, a microwave, or devices capable of hybrid heating (i.e., conventional heating and microwave heating). This type of separate heater may be used for heating the cured intermediate part 56' (see, e.g., FIG. 3D) after it is removed from the printing system 10, and/or the at least substantially binder-free part 60 (see, e.g., FIG. 3F) after the cured intermediate part 56' is removed from the build material cake 58. In other examples, patterning may take place in the printing system 10, and then the build material platform 12 with the patterned intermediate part 56 thereon may be detached from the system 10 and placed into the separate heater for curing/activation. Once the cured intermediate part 56' is formed, the build material cake 58 may be removed and the cured intermediate part 56' may be separated from the build material cake 58, and then sintering, or de-binding and sintering may take place in the separate heater.

The heat and/or radiation source 26, 26' may be a source 26, 26' of electromagnetic radiation when the water-insoluble binder 22 is to be activated by heat, infrared or ultraviolet radiation. The source 26, 26' of electromagnetic radiation may emit infrared radiation having wavelengths ranging from about 800 nm to about 2 mm, which may be used for evaporation and/or thermal activation of the water-insoluble binder 22. As another example, the electromagnetic radiation may be ultraviolet radiation having wavelengths ranging from about 100 nm to about 400 nm, which may be used for UV activation of the water-insoluble binder 22. In this example, the source 26, 26' of electromagnetic radiation may be ultraviolet (UV) light sources, such as UV curing lamps, UV light emitting diodes (LED), xenon (Xe) flash lamps, or lasers with the desirable UV electromagnetic wavelengths. As still another example, the electromagnetic radiation may be visible light having wavelengths ranging from about 400 nm to about 800 nm, which may be used for evaporation and/or thermal activation of the water-insoluble binder 22. In this example, the source 26, 26' of electromagnetic radiation may be visible light sources, such as incandescent lamps, fluorescent lamps, Xe flash lamps, light emitting diodes (LED), or lasers with the desirable visible electromagnetic wavelengths.

As depicted in FIG. 1, the heat and/or radiation source 26, 26' may be a stationary lamp 26' or a moving lamp 26. The stationary lamp 26' may be in a fixed position relative to the build area platform 12, and may be turned on when heat exposure is desired and off when heat exposure is not desired. The moving lamp(s) 26 can be mounted on a track (e.g., translational carriage 50) to move across the build area platform 12 in a direction as denoted by the arrow 48, e.g., along the y-axis. This allows for printing and heating in a single pass. Such lamps 26 can make multiple passes over the build area platform 12 depending on the amount of exposure utilized in the method(s) disclosed herein. In the example shown in FIG. 1, the lamps 26 are mounted at opposite ends of the inkjet applicator 24 so that heat can be applied to the build material 16 immediately before the patterning fluid 20 is deposited and/or immediately after the patterning fluid 20 is deposited, depending on the movement of the translational carriage 50. In an example, the moving lamp 26 at the left side of the translational carriage 50 may be a leading lamp and the moving lamp 26 at the right side of the translational carriage 50 may be a trailing lamp.

The heat and/or radiation source 26, 26' may heat and/or irradiate the entire build area platform 12 with a substantially uniform amount of energy. This can selectively activate the water-insoluble binder particles 22 in the portions 40 of the metallic particles 30 patterned with the patterning fluid 20, while leaving the unpatterned portion(s) 42 (see, e.g., FIG. 3B) of the metallic particles 30 below their melting or softening point (and thus not sintered).

The heat and/or radiation source 26, 26' may be operatively connected to a lamp/laser/LED driver, an input/output temperature controller, and temperature sensors, which are collectively shown as heat system components 52. The heat system components 52 may operate together to control the heat and/or radiation source 26, 26'. The temperature recipe (e.g., heat/radiation exposure rate) may be submitted to the input/output temperature controller. During heating, the temperature sensors may sense the temperature of the metallic particles 30, and the temperature measurements may be transmitted to the input/output temperature controller. For example, a thermometer associated with the heated area can provide temperature feedback. The input/output temperature controller may adjust the heat source 26, 26' power set points based on any difference between the recipe and the real-time measurements. These power set points are sent to the lamp/laser drivers, which transmit appropriate lamp/laser voltages to the heat and/or radiation source 26, 26'. This is one example of the heat system components 52, and it is to be understood that other heat source control systems may be used. For example, the controller 28 may be configured to control the heat and/or radiation source 26, 26'.

Each of these physical elements may be operatively connected to the controller 28 of the printing system 10. The controller 28 may process print data that is based on a 3D object model of the 3D object/part to be generated. In response to data processing, the controller 28 may control the operations of the build area platform 12, the build material supply 14, the build material distributor 18, the inkjet applicator 24, and the heat source 26, 26'. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the intermediate part 56, 56'. As such, the controller 28 is depicted as being in communication with a data store 54. The data store 54 may include data pertaining to a 3D part to be printed by the 3D printing system 10. The data for the selective delivery/application of the build material slurry 16 and the patterning 20 may be derived from a model of the 3D part to be formed. For instance, the data may include whether or not to heat to evaporate the water 34 from the slurry layer 36, the locations on each build material layer 38 that the inkjet applicator 24 is to deposit the patterning fluid 20, and the manner in which the water-insoluble binder 22 is to be cured. In one example, the controller 28 may use the data to control the heat source 26, 26' to heat the slurry layer 36, then the controller 28 may use the data to control the inkjet applicator 24 to selectively apply the patterning fluid 20, and then the controller 28 may use the data to control the heat source 26, 26' to activate the water-insoluble binder 22. The data store 54 may also include machine readable instructions (stored on a non-transitory computer readable medium) that are to cause the controller 28 to control the amount of build material slurry 16 that is supplied by the build material supply 14, the movement of the build area platform 12, the movement of the build material distributor 18, the movement of the inkjet applicator 24, the movement of the heat source 26, 26', etc.

FIG. 1 also illustrates a slurry layer 36 of the build material slurry 16 on the build area platform 12.

Referring now to FIG. 2 and FIGS. 3A through 3E, an example of the 3D printing method 100, 200 is depicted. Prior to execution of the method 100, 200 or as part of the method 100, 200, the controller 28 may access data stored in the data store 54 pertaining to a 3D part that is to be printed. The controller 28 may determine the number of build material layers 38 from the build material slurry 16 that are to be formed, the locations at which patterning fluid 20 from the inkjet applicator 24 is to be deposited on each of the respective layers.

Briefly, the method 100 for three-dimensional (3D) printing comprises: applying the build material slurry 16 to form the slurry layer 36, the build material slurry 16 including: metallic particles 30; the water-soluble binder 32; and water 34 (reference numeral 102); evaporating at least some of the water 34 from the slurry layer 36 to form the build material layer 38 (reference numeral 104); and selectively applying the patterning fluid 20 on at least a portion 40 of the build material layer 38, the patterning fluid 20 including the water-insoluble binder 22 (reference numeral 106).

Figure 2:
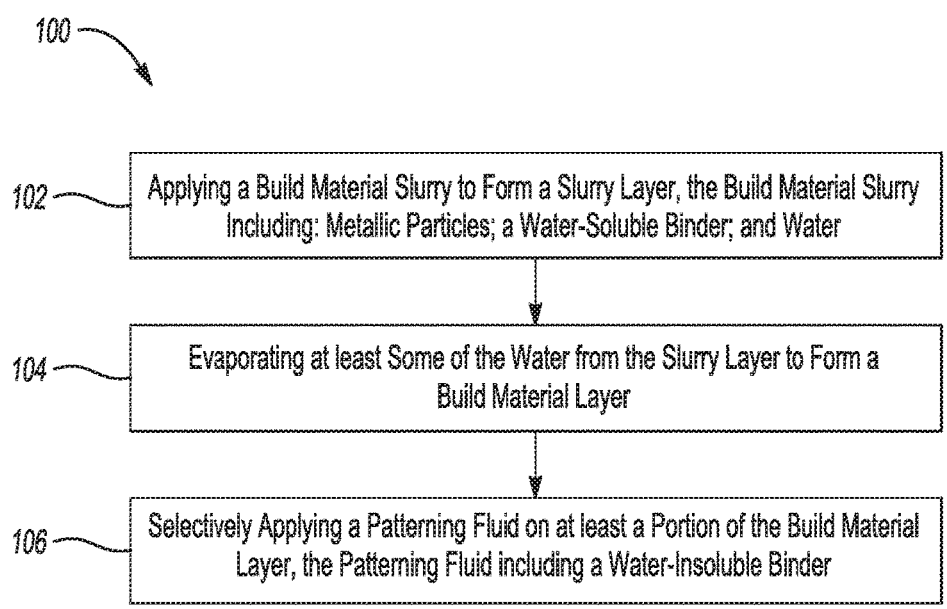
FIG. 2 is a flow diagram illustrating an example of a method for 3D printing disclosed herein.

As shown at reference numeral 102 in FIG. 2, the method 100, 200 includes applying the build material slurry 16 to form the slurry layer 36. The build material slurry 16, as described above, includes the metallic particles 30, the water-soluble binder 32, and water 34. It is to be understood that any examples of the slurry previously described herein may be used in the method 100, 200. As examples of the method 100, 200, the particle size of each of the metallic particles 30 is up to 20 μm; and/or the metallic particles 30 are present in the build material slurry 16 in an amount ranging from about 50 wt % to about 97 wt % based on the total weight of the build material slurry 16.

The build material supply 14 may supply the build material slurry 16 into a position so that it is ready to be spread onto the build area platform 12. The build material distributor 18 may spread the supplied build material slurry 16 onto the build area platform 12 to form the slurry layer 36. The controller 28 (shown in FIG. 1) may process control build material supply data, and in response control the build material supply 14 to appropriately position the build material slurry 16, and may process control spreader data, and in response control the build material distributor 18 to spread the supplied build material slurry 16 over the build area platform 12 to form the slurry layer 36 thereon.

In some examples of the method 100, 200, the applying of the build material slurry 16 is accomplished using a doctor blade, a slot die coater, a rod coater, a blade coater, a fountain curtain coater, or combinations thereof. In some examples of the method 100, 200, the applying of the build material slurry 16 is accomplished using a combination of the aforementioned coating methods (e.g., a doctor blade in conjunction with a slot die coater) as previously described. The slurry layer 36 (shown in FIG. 1) formed by applying the build material slurry 16 has a substantially uniform thickness across the build area platform 12.

Figure 3A:
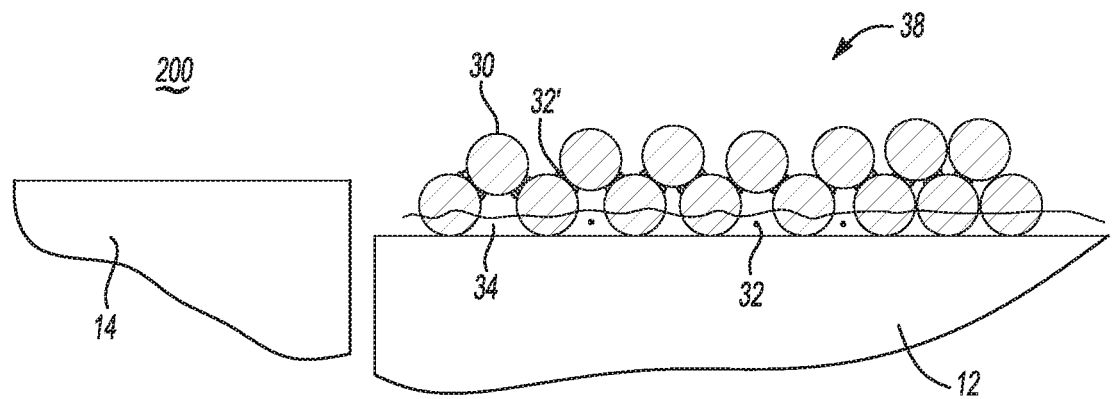

As shown at reference numeral 104, the method 100, 200 further includes evaporating at least some of the water 34 from the slurry layer 36 to form the build material layer 38. An example of the build material layer 38 is shown in FIG. 3A. In FIG. 3A, as the water 34 evaporates, the water-soluble binder 32 may form a water-soluble glue 32' that coats the build metallic particles 30 and holds them in place in the build material layer 38. Enough water 34 may be evaporated from the slurry layer 36 so that sufficient empty volume is created between metallic particles 30 in the build material layer 38 to accommodate the application of the patterning fluid 20 containing the water-insoluble binder 22. As an example, for a build material layer thickness of 50 μm, a drop volume for jetted patterning fluid of 10 pL, a printing resolution of 600 DPI, and a metallic powder packing fraction of 0.5, at least 33% of the water should be evaporated prior to application of the patterning fluid 20. In the example shown in FIG. 3A, some of the water 34 remains in the build material layer 38. In another example, shown in FIG. 3B, the water 34 is completely evaporated from the build material layer 38.

In some examples of the method 100, 200, the evaporating is accomplished by heating the slurry layer 36. In these examples, heating may take place at a temperature and for a time period that is capable of evaporating at least some of the water 34. In an example, the evaporation temperature may be above ambient temperature.

As used therein, "ambient temperature" may refer to room temperature (e.g., ranging about 18° C. to about 22° C.), or to the temperature of the environment in which the 3D printing method 100, 200 is performed. Examples of the 3D printing environment ambient temperature may range from about 40° C. to about 50° C. The temperature of the build area powder cake 58 may be controlled during processing by heaters 26 in the build area platform 12 and/or along the sides of the build volume. Examples of build area powder cake temperature may range from about 40° C. to about 100° C.

Evaporation of water from the most recently applied slurry layer 36 is dependent on the temperature of that layer 36. Both the ambient temperature and powder cake temperature can influence the temperature of the recently applied slurry layer 36. Additional control of the slurry layer temperature is provided by heaters 26, 26' that can deliver energy (e.g., by radiation) to the upper surface of the recently applied slurry layer 36. Energy from heaters 26, 26' can rapidly heat the recently applied slurry layer 36 to a temperature of up to about 250° C. in order to accelerate evaporation. In another example, the evaporation temperature is below a temperature at which the water-soluble binder 32 would be damaged (i.e., be unable to bind the metallic particles 30 or be unable to be dissolved in water). For a majority of water-soluble binders 32, the upper limit of the evaporation temperature ranges from about 150° C. to about 220° C. Above this temperature threshold, the water-soluble binder 32 may chemically degrade into volatile species and leave the build material layer 38, and thus would stop performing its binding function, or may be chemically modified in a manner that prevents subsequent dissolution in water. For a majority of build material slurries 16, the evaporation temperature ranges from about 50° C. to about 220° C. As another example, the evaporation temperature may range from about 80° C. to about 120° C. As still another example, the evaporation temperature may range from about 70° C. to about 90° C.

The evaporation time may also depend, in part, on the evaporation temperature and/or the thickness of the slurry layer 36. For example, a higher evaporation temperature and/or a thinner slurry layer 36 may result in a shorter evaporation time period, and a lower evaporation temperature and/or a thicker slurry layer 36 may result in a longer evaporation time period. Evaporation, and thus the formation of the build material layer 38, may vary, depending upon the temperature, humidity, and/or air circulation. For a majority of build material slurries 16, the evaporation time period ranges from about 1 second to about 1 minute per layer 36. In an example, the evaporation time period is about 5 seconds.

Evaporating at least some of the water 34 allows the water-soluble binder 32 to bind the metallic particles 30 and forms the build material layer 38. Evaporating at least some of the water 34 also creates space(s) between the metallic particles 30 so that the patterning fluid 20 may penetrate the build material layer 38. Evaporation of the water 34 also may result in the densification of the metallic particles 30 through capillary action.

The thickness of the build material layer 38 may be about the same as or less than the thickness of the slurry layer 36. In an example, the build material layer 38 may densify up to about 25% with respect to the slurry layer 36. In an example, the thickness of the slurry layer 36 may be about 100 µm and the thickness of the build material layer is about 75 µm. In an example, the build material layer 38 has a thickness ranging from about 30 µm to about 150 µm. In another example, the thickness of the build material layer 38 is about 100 µm. In still another example, the thickness of the build material layer 38 ranges from about 50 µm to about 80 µm, although thinner or thicker layers may also be used. For example, the thickness of the build material layer 38 may range from about 20 µm to about 300 µm. The layer thickness may be about 2× (i.e., 2 times) the particle diameter (as shown in FIG. 3A) at a minimum for finer part definition. In some examples, the layer thickness may be about 1.5× the particle diameter.

Figure 3B:
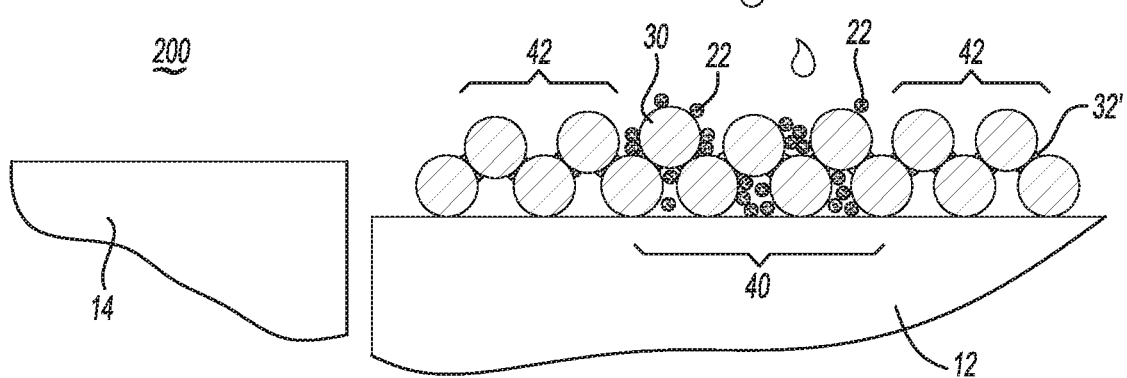

As shown at reference numeral 106 in FIG. 2 and in FIG. 3B, the method 100, 200 continues by selectively applying the patterning fluid 20 on at least a portion 40 of the build material layer 38.

The patterning fluid 20 includes the water-insoluble binder 22 and a liquid vehicle. In some instances, the patterning fluid 20 consists of the water-insoluble binder 22 and the liquid vehicle, without any other components.

In some examples, the water-insoluble binder particles 22 are dissolved or dispersed throughout the liquid vehicle. It is to be understood that the water-insoluble binder 22 is insoluble in water after activation. As such, when the water-insoluble binder particles 22 are dissolved or dispensed in the liquid vehicle, the liquid vehicle may be non-aqueous or the water-insoluble binder 22 may become insoluble in water after it is activated.

When applied to the build material layer 38, the liquid vehicle is capable of wetting the metallic particles 30 and the water-insoluble binder particles 22 are capable of penetrating into the microscopic pores/voids of the build material layer 38 (i.e., the spaces between the metallic particles 30). In an example, the water-insoluble binder particles 22 in the patterning fluid 20 can be activated or cured by heating them to an activation temperature that is at or above the minimum film formation temperature (MFFT) of the patterning fluid 20. In another example, the water-insoluble binder particles 22 in the patterning fluid 20 can be activated or cured by exposing them to electromagnetic radiation.

In the examples disclosed herein, the water-insoluble binder particles 22 may be activated or cured within each patterned build material layer 38, or after several patterned build material layers have been built up to form an intermediate part 56. In the layer-by-layer activation or curing process, the water-insoluble binder 22 may form a substantially continuous network/continuous polymer phase/glue 22' within each layer 38, and when all of the layers are printed, the cured intermediate part 56' is formed. When activated or cured after an intermediate part 56 is formed, the water-insoluble binder 22 may form an at least substantially continuous network/continuous polymer phase/glue 22' (see, e.g., FIG. 3C) gluing the metallic particles 30 into the cured intermediate part 56'. The cured intermediate part 56' has enough mechanical strength such that it is able to withstand extraction from the build material platform 12 without being deleteriously affected (e.g., the shape is not lost). In some examples, the cured intermediate part 56' is extracted in an aqueous extraction process. In these examples, the water-soluble binder glue 32' dissolves and debinds the metallic particles 30 in the unpatterned portion(s) 42 of the build material layer(s) 38, and the water-insoluble binder glue 22' remains and enables the cured intermediate part 56' to withstand the extraction process.

Once extracted, the cured intermediate part 56' can be debound by heating the cured intermediate part 56' to the thermal decomposition temperature of the water-insoluble binder particles 22, 22' to thermally decompose the water-insoluble binder particles 22, 22'. When at least some of the water-insoluble binder particles 22, 22' are thermally decomposed, an at least substantially binder-free part 60 is formed. Then, the at least substantially binder-free part 60 can be heated to a sintering temperature to sinter the metallic particles 30 and form the sintered part 62 (see, e.g., FIG. 3F).

In some examples, the water-insoluble binders 22 may be sacrificial intermediate binders in that they are present in various stages of the intermediate part 56, 56' that is formed, and then are ultimately removed (through thermal decomposition) from the at least substantially binder-free part 60, and thus are not present in the final sintered part 62.

In other examples, the water-insoluble binders 22 include materials that are not removed by thermal decomposition and are retained in the sintered part 62. Metal nanoparticles and activated metal salts (e.g., metal salt decomposition products) are examples of water-insoluble binder materials that are not removed from the part by thermal decomposition. Examples of metal nanoparticle binders include silver (Ag), copper (Cu), gold (Au), nickel (Ni) and cobalt (Co) nanoparticles Examples of metal salt binders include copper nitrate $(Cu(NO_3)_2)$, iron nitrate $(Fe(NO_3)_3)$, cobalt nitrate $(Co(NO_3)_2)$, nickel nitrate $(Ni(NO_3)_2)$, iron acetate $(Fe(CH_3COO)_2)$ magnesium acetate $(Mg(CH_3COO)_2)$, copper sulfate $(CuSO_4)$, and manganese sulfate $(MgSO_4)$. These metal salts are soluble in the patterning fluid 20. After exposure to elevated temperature, these metal salts can be activated (decomposed) to water-insoluble decomposition products, such as metal oxides.

The water-insoluble binder 22 may be any material that i) has enough adhesive strength to hold the metallic particles 30 together in the cured intermediate part 56', and ii) is insoluble in water after being activated. The water-insoluble binder 22 may be soluble in water prior to activation, as long as it is insoluble in water after activation. In an example, the water-insoluble binder 22 (after activation) has a solubility in water of less than 0.1 wt % at 50° C. In another example, the water-insoluble binder 22 may have a solubility low enough that none of the water-insoluble binder 22 dissolves in the water used in the wet extraction process. It is to be understood that there is no lower limit on the water-insoluble binder's 22 solubility in water (after activation), and the lower the solubility, the better.

In some examples, the water-insoluble binder 22 may be activated by heating the water-insoluble binder particles 22 to an activation temperature. The activation temperature equals or exceeds the minimum film formation temperature (MFFT) of the patterning fluid 20. In an example, an entire build material layer 38, including a portion 40 having the patterning fluid 20 selectively applied thereon, may be brought to the activation temperature. At temperatures at or above the MFFT, the water-insoluble binder particles 22 coalesce and form a polymer glue 22' that coats the metallic particles 30 and creates the cured intermediate part 56' or a cured layer thereof. In other words, at or above the MFFT, the water-insoluble binder particles 22 coalesce to form a continuous network 22' that binds the patterned volume of metallic particles 30. In these examples, heating the patterned intermediate part 56 or a particular part layer to the activation temperature (e.g., the MFFT of the patterning fluid 20) activates the water-insoluble binder 22.

In other examples, the water-insoluble binder 22 may be activated by exposing the water-insoluble binder 22 to electromagnetic radiation. In an example, an entire build material layer 38, including a portion 40 having the patterning fluid 20 selectively applied thereon, may be exposed to the electromagnetic radiation. When the water-insoluble binder 22 is exposed to the electromagnetic radiation, the electromagnetic radiation may cross-link the water-insoluble binder 22 to form a glue 22' that coats the metallic particles 30 and creates the cured intermediate part 56' or a layer thereof. In some examples, the water-insoluble binder 22 is activated by ultraviolet (UV) radiation (e.g., wavelengths ranging from about 100 nm to about 400 nm).

Examples of the water-insoluble binder 22 that may be activated by reaching or exceeding the MFFT activation temperature include latex polymer particles. As such, in some examples, the water-insoluble binder 22 is a latex. As used herein, the term "latex" refers to a polymer that is capable of being dispersed in an aqueous medium. The latex may be a colloidal dispersion of polymer particles in the liquid vehicle of the patterning fluid 20.

In some examples disclosed herein, the polymer particles of the latex are heteropolymers or co-polymers. The heteropolymers may include a more hydrophobic component and a more hydrophilic component. In these examples, the hydrophilic component renders the particles dispersible in the patterning fluid 20, while the hydrophobic component is capable of coalescing upon reaching the MFFT in order to bind the metallic particles 30 together to form the cured intermediate part 56' or layer thereof.

Examples of monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of hydrophilic monomers include acrylamide, methacrylamide, monohydroxylated monomers, monoethoxylated monomers, polyhydroxylated monomers, or polyethoxylated monomers.

In some examples of the heteropolymers disclosed herein, the hydrophobic component(s) make up from about 65% to about 100% of the polymer, and the hydrophilic component(s) make up from about 0.1% to about 35% of the polymer.

Some specific examples of the latex polymer particles are formed with the following monomer combinations: i) butyl acrylate, styrene, methyl methacrylate, and methacrylic acid; or ii) butyl acrylate, methyl methacrylate, methacrylic acid, cyclohexyl methacrylate, cyclohexyl acrylate, and 2-phenoxyethyl methacrylate.

The polymer particles of the latex may have a particle size that can be jetted via thermal inkjet printing or piezoelectric printing or continuous inkjet printing. In an example, the particle size of the polymer particles ranges from about 10 nm to about 300 nm.

Examples of the water-insoluble binder 22 that can be activated by exposure to electromagnetic radiation in the UV range (wavelength 100-400 nm) include epoxy acrylates, aliphatic urethane acrylates, aromatic urethane acrylates, polyester acrylates, and acrylic acrylates. These materials can be present in the patterning solution 20 as monomers or oligomers and are cured into a polymer by exposure to ultraviolet radiation. Further examples include bisphenol A epoxy acrylate, IPDI-based aliphatic urethane acrylate, tripropylene glycol diacrylate, and trimethylol propane triacrylate. It is to be understood that when the water-insoluble binder 22 is to be activated by electromagnetic radiation, it may be desirable to apply the build material slurry 16 in thin slurry layers 36, and form thin build material layers 38 (e.g., layers 38 having a thickness ranging from about 20 μm to about 80 μm). It may be desirable to use such thin layers 38 so that the electromagnetic radiation may penetrate through the entire thickness of the build material layer 38 to substantially cure the water-insoluble binder 22 in that layer 38. The electromagnetic radiation may be unable to penetrate deeper into the layer 38 because the metallic particles 30 may block the electromagnetic radiation. As such, layer-by-layer activation may be desirable with these types of water-insoluble binders 22. Layer by layer activation builds the cured intermediate part 56' one layer at a time. Exposure of some UV curable resins to elevated temperature can at least partially cure the resin or can accelerate the curing process.

Application of thermal energy by either conductive or radiative heating from heaters 26, 26' during UV curing may facilitate polymerization.

In some instances the UV monomers or oligomers are dispersed in the water-based patterning fluid 20 that is applied to the build material layer 38 to define a patterned portion 40 of the build area. For effective curing of monomers or oligomers, most, if not all, of the water in the patterning fluid 20 is evaporated before UV exposure. Sufficient energy can be supplied from the heaters 26, 26' to ensure evaporation of the water of the patterning fluid 20 from the patterned portion 40.

While several example water-insoluble binders 22 have been described, in an example of the patterning fluid 20, the water-insoluble binder 22 may be selected from the group consisting of acrylic latex, polyurethane, polyethylene, polypropylene, polyamide, UV curable monomers and oligomers, metal nanoparticles, metal salts and combinations thereof.

The water-insoluble binder 22 may be present in the patterning fluid 20 in an amount ranging from about 2 wt % to about 30 wt %, or from about 3 wt % to about 20 wt %, or from about 5 wt % to about 15 wt % (based upon the total weight of the patterning fluid 20). In another example, the water-insoluble binder 22 may be present in the patterning fluid 20 in an amount ranging from about 5 vol % to about 30 vol % (based upon the total vol % of the patterning fluid 20). It is believed that these water-insoluble binder loadings provide a balance between the patterning fluid 20 having jetting reliability and binding efficiency.

As mentioned above, the patterning fluid 20 includes the water-insoluble binder 22 and the liquid vehicle. As used herein, "liquid vehicle" may refer to the liquid fluid in which the water-insoluble binder particles 22 are dispersed or dissolved to form the patterning fluid 20. A wide variety of liquid vehicles, including aqueous and non-aqueous vehicles, may be used with the patterning fluid 20. In some instances, the liquid vehicle consists of a primary solvent with no other components. In other examples, the patterning fluid 20 may include other ingredients, depending, in part, upon the inkjet applicator 24 that is to be used to dispense the patterning fluid 20. Examples of other suitable patterning fluid components include co-solvent(s), surfactant(s), antimicrobial agent(s), anti-kogation agent(s), and/or sequestering agent(s).

The primary solvent may be water or a non-aqueous solvent (e.g., ethanol, acetone, n-methyl pyrrolidone, aliphatic hydrocarbons, etc.). In some examples, the patterning fluid 20 consists of the water-insoluble binder particles 22 and the primary solvent (with no other components). In these examples, the primary solvent makes up the balance of the patterning fluid 20.

Classes of organic co-solvents that may be used in the water-based patterning fluid 20 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents (i.e., humectants), which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the patterning fluid 20 in a total amount ranging from about 1 wt % to about 50 wt %, based upon the total weight of the patterning fluid 20, depending upon the jetting architecture of the inkjet applicator 24. In an example, the total amount of the co-solvent(s) present in the patterning fluid 20 is 25 wt %, based on the total weight of the patterning fluid 20.

The co-solvent(s) of the patterning fluid 20 may depend, in part upon the jetting technology that is to be used to dispense the patterning fluid 20. For example, if thermal inkjet is to be used, water and/or ethanol and/or other longer chain alcohols (e.g., pentanol) may be the primary solvent or co-solvents (i.e., makes up 35 wt % or more of the patterning fluid 20). For another example, if piezoelectric inkjet is to be used, water may make up from about 25 wt % to about 30 wt % of the patterning fluid 20, and the primary solvent (i.e., 35 wt % or more) may be ethanol, isopropanol, acetone, etc.

In some examples, the liquid vehicle of the patterning fluid 20 includes a coalescing solvent. In these examples, the coalescing solvent may plasticize the water-insoluble binder particles 22 and enhances the coalescing of the water-insoluble binder particles 22 upon reaching the MFFT in order to temporarily bind the metallic particles 30 together to form the cured intermediate part 56' or a layer thereof.

In some examples, the coalescing solvent may be a lactone, such as 2-pyrrolidinone, 1-(2-hydroxyethyl)-2-pyrrolidone, etc. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, etc. In still other examples, the coalescing solvent may be a water-soluble polyhydric alcohol, such as 2-methyl-1,3-propanediol, etc. In still other examples, the coalescing solvent may selected from any of the listed solvents or may be a combination of any of the examples above.

The coalescing solvent may be present in the patterning fluid 20 in an amount ranging from about 0.1 wt % to about 50 wt % (based upon the total weight of the patterning fluid 20). In some examples, greater or lesser amounts of the coalescing solvent may be used depending, in part, upon the jetting architecture of the inkjet applicator 24.

As mentioned above, in some examples the liquid vehicles includes surfactant(s). Surfactant(s) may be used to improve the jettability of the patterning fluid 20. Examples of suitable surfactants include any of the surfactants listed above in reference to the build material slurry 16.

Whether a single surfactant is used or a combination of surfactants is used, the total amount of surfactant(s) in the patterning fluid 20 may range from about 0.01 wt % to about 10 wt %, based on the total weight of the patterning fluid 20.

In an example, the total amount of surfactant(s) in the patterning fluid 20 may be about 3 wt %, based on the total weight of the patterning fluid 20.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the patterning fluid 20 may include a total amount of antimicrobial agents that ranges from about 0.05 wt % to about 1 wt %. In an example, the antimicrobial agent(s) is/are a biocide(s) and is/are present in the patterning fluid 20 in an amount of about 0.25 wt % (based on the total weight of the patterning fluid 20).

An anti-kogation agent may be included in the patterning fluid 20. Kogation refers to the deposit of dried ink (e.g., patterning fluid 20) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) acrylic acid polymer (e.g., commercially available as CAR-BOSPERSE™ K-7028 from Lubrizol).

Whether a single anti-kogation agent is used or a combination of anti-kogation agents is used, the total amount of anti-kogation agent(s) in the patterning fluid 20 may range from greater than 0.20 wt % to about 0.62 wt %, based on the total weight of the patterning fluid 20. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents (or chelating agents) may be included in the liquid vehicle to eliminate the deleterious effects of heavy metal impurities. Examples of suitable sequestering agents include disodium ethylenediaminetetraacetic acid (EDTA-Na), ethylene diamine tetra acetic acid (EDTA), and methylglycinediacetic acid (e.g., TRILON® M from BASF Corp.).

Whether a single sequestering agent is used or a combination of sequestering agents is used, the total amount of sequestering agent(s) in the patterning fluid 20 may range from greater than 0 wt % to about 2 wt %, based on the total weight of the patterning fluid 20. In an example, the sequestering agent(s) is/are present in the patterning fluid 20 in an amount of about 0.04 wt % (based on the total weight of the patterning fluid 20).

The composition of the liquid vehicle may depend on the water-insoluble binder 22 used. In an example, the water-insoluble binder 22 may be an acrylic latex, and the liquid vehicle may include 2-methyl-1,3-propanediol, 2-pyrrolidone, a non-ionic surfactant, a fluorosurfactant and a balance of water.

As illustrated in FIG. 3B, the patterning fluid 20 may be dispensed from the inkjet applicator 24. As mentioned above, the inkjet applicator 24 may be a thermal inkjet printhead, a piezoelectric printhead, etc. As such, the selectively applying of the patterning fluid 20 may be accomplished by thermal inkjet printing, piezo electric inkjet printing, etc.

The controller 28 may process data, and in response, control the inkjet applicator 24 (e.g., in the directions indicated by the arrow 48) to deposit the patterning fluid 20 onto predetermined portion(s) 40 of the build material layer 38 that are to become part of the patterned intermediate part 56 and are to ultimately be sintered to form the sintered part 62. The inkjet applicator 24 may be programmed to receive commands from the controller 28 and to deposit the patterning fluid 20 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 3B, the inkjet applicator 24 selectively applies the patterning fluid 20 on those portion(s) 40 of the build material layer 38 that is/are to become the first layer of the sintered part 62. As an example, if the 3D part that is to be formed is to be shaped like a cube or cylinder, the patterning fluid 20 will be deposited in a square pattern or a circular pattern (from a top view), respectively, on at least a portion 40 of the build material layer 38.

It is to be understood that a single patterning fluid 20 may be selectively applied to pattern the build material layer 38, or multiple patterning fluids 20 may be selectively applied to pattern the build material layer 38.

As mentioned above, the patterning fluid 20 includes the water-insoluble binder 22 and the liquid vehicle. The volume of the patterning fluid 20 that is applied per unit of the metallic particles 30 in the patterned portion 40 may be sufficient to provide enough of the water-insoluble binder 22 so that the metallic particles 30 in the patterned portion 40 will be bound together with enough mechanical strength to withstand the extraction process. The volume of the patterning fluid 20 that is applied per unit of the metallic particles 30 in the patterned portion 40 may depend, at least in part, on the water-insoluble binder 22 used, the water-insoluble binder loading in the patterning fluid 20, and the metallic particles 30 used.

It is to be understood that portions 42 of the build material layer 38 that do not have the patterning fluid 20 applied thereto also do not have the water-insoluble binder particles 22 introduced thereto. As such, these portions 42 do not become part of the patterned intermediate part 56 that is ultimately formed.

Following the application of the patterning fluid 20 (which adds more water to the build material layer 38), enough water may be evaporated from the patterned build material layer so that the water-insoluble binder 22, when activated, may bind the metallic particles 30 together through the entire thickness of the build material layer(s) 38. Whether activation or curing takes place in the layer-by-layer fashion or after the formation of the intermediate part 56, it is to be understood that a minimum of 50% of the water volume should be evaporated from the patterned build material layer 38 prior to application of a subsequent slurry layer 36. The removal of additional liquid (e.g., water) from the patterned portion 40 may be accomplished by additional heating that is sufficient to drive off the liquid.

As mentioned above, some examples of the method 100, 200 involve activating (e.g., curing) the water-insoluble binder 22 in a layer-by-layer process. In these examples of the method 100, 200, the method 100, 200 further comprises removing at least some liquid (e.g., water) of the patterning fluid 20 from the at least the portion 40 of the build material layer 38; and activating the water-insoluble binder 22 in the at least the portion 40 of the build material layer 38.

Figure 3C:
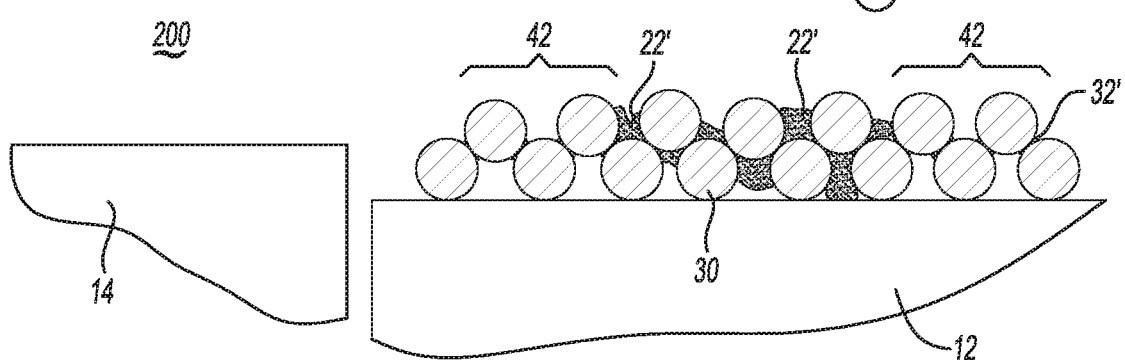

As shown in FIG. 3C, the build material layer 38 may be exposed to heating using the heat and/or radiation source 26 after the patterning fluid 20 is applied to the build material layer 38 and before another build material layer 38 is formed. In an example, the heat and/or radiation source 26 may be used to heat the build material layer 38 to evaporate the water and to activate the water-insoluble binder 22 during printing layer-by-layer, and for producing a stabilized and cured intermediate part layer. In these examples, heating to form the cured intermediate part layer may take place at a temperature that is capable of activating (or curing) the water-insoluble binder 22 of the patterning fluid 20, but that is not capable of thermally decomposing the water-soluble binder 32, thermally decomposing the water-insoluble binder 22, or sintering the metallic particles 30. In an example, the activation temperature is at or above the MFFT of the patterning fluid 20. Other examples of suitable activation temperatures are provided below. In another example, the heat and/or radiation source 26 may be used to heat to at least partially remove the liquid from the patterning fluid 20 and to expose the build material layer 38 to UV radiation to activate the water-insoluble binder 22 during printing layer-by-layer, and for producing a stabilized and cured intermediate part layer. In these examples, exposure to UV radiation to form the cured intermediate part layer may take place at a wavelength that is capable of cross-linking (or curing) the water-insoluble binder 22. As an example, the electromagnetic radiation may have a wavelength ranging from about 100 nm to about 400 nm.

In the examples in which the build material layer 38 may be exposed to heating and/or electromagnetic radiation using the heat and/or radiation source 26, the processes shown in FIGS. 3A-3C (including applying of the build material slurry 16, the evaporating of the water from the slurry 16, the selective application of the patterning fluid 20, the removing of liquid from the patterning fluid 20, and the activating of the water-insoluble binder 22) may be repeated to iteratively build up several cured layers and to produce the cured intermediate part 56'. The cured intermediate part 56' can then be exposed to the processes described in reference to FIGS. 3E and 3F.

It is to be understood that when the water-insoluble binder 22 is to be activated by electromagnetic radiation, it may be desirable to activate the water-insoluble binder 22 layer-by-layer so that the electromagnetic radiation may penetrate a substantial portion of the layers' 38 thickness and cure the water-insoluble binder 22 in that substantial portion. As mentioned above, the electromagnetic radiation may be unable to penetrate deeper into the layer 38 because the metallic particles 30 may block the electromagnetic radiation.

Also mentioned above, some examples of the method 100, 200 involve forming the intermediate part 56 (in which the water-insoluble binder 22 in not yet activated/cured). In these examples, after the application of the patterning fluid 20, the method 100, 200 further comprises: removing at least some liquid (e.g., water) of the patterning fluid 20 from the at least the portion 40 of the build material layer 38; then repeating each of: the applying of the build material slurry 16, the evaporating of the water from the slurry 16, the selectively applying of the patterning fluid 20, and the removing (of at least some liquid of the patterning fluid 20) to form an intermediate part 56; activating the water-insoluble binder 22 in the intermediate part 56 to form a cured intermediate part 56'; and heating the cured intermediate part 56' to form a sintered part 62. In these examples, the processes shown in FIGS. 3A and 3B may be repeated to iteratively build up several patterned layers and to form the patterned intermediate part 56. Following deposition of the patterning fluid 20 onto predetermined portion(s) 40 of the build material layer 38, the controller 28 may process data, and in response, control the build area platform 12 to be moved a relatively small distance in the down direction denoted by the bi-directional arrow 44 (shown in FIG. 1). In other words, the build area platform 12 may be lowered to enable the next layer of build material slurry 16 applied to be form the next build material layer 38. For example, the build material platform 12 may be lowered a distance that is equivalent to the height of the layer 38. In addition, following the lowering of the build area platform 12, the controller 28 may control the build material supply 14 to supply additional build material slurry 16 (e.g., through operation of an elevator, an auger, or the like) and the build material distributor 18 to form another slurry layer 36 on top of the previously formed build material layer 38. Water 34 may be evaporated from the newly formed slurry layer 36 to form another build material layer 38, and the newly formed build material layer 38 may be patterned with patterning fluid 20. Liquid from the patterning fluid 20 may then be evaporated in preparation for the application of a subsequent slurry layer 36.

Repeatedly forming and patterning new layers (without activating and curing each layer) results in the formation of a build material cake 58, as shown in FIG. 3D, which includes the patterned intermediate part 56 residing within the non-patterned portions 42 of each of the build material layers 38. The patterned intermediate part 56 is a volume of the build material cake 58 that is filled with the metallic particles 30 and water-insoluble binder 22 from the patterning fluid 20 within the inter-particle spaces. The remainder of the build material cake 58 is made up of the non-patterned metallic particles 30 bound by the water-soluble binder glue 32'.

Also as shown in FIG. 3D, the build material cake 58 may be exposed to heat or electromagnetic radiation to generate heat, as denoted by the arrows 64. In an example, the heat applied may be sufficient to activate the water-insoluble binder 22 in the patterned intermediate part 56 and to produce a stabilized and cured intermediate part 56'. In the example shown in FIG. 3D, the build material cake 58 may remain on the build area platform 12 while being heated by the heat and/or radiation source 26'. In another example, the build area platform 12, with the build material cake 58 thereon, may be detached from the inkjet applicator 24 and placed in a separate heat source. Any of the previously described heat and/or radiation sources 26 and/or 26' may be used.

In some examples, the patterned intermediate part 56 may be heated to the activation temperature to activate the water-insoluble binder 22. In these examples, heating to form the cured intermediate part 56' may take place at a temperature that is capable of activating (or curing) the water-insoluble binder 22 of the patterning fluid 20, but that is not capable of sintering the metallic particles 30 or of thermally degrading the water-soluble binder glue 32' and/or the water-insoluble binder particles 22. In an example, the activation temperature is at or above the minimum film formation temperature (MFFT) of the patterning fluid 20 and below the thermal decomposition temperature of the water-soluble binder glue 32' and/or the thermal decomposition temperature of the water-insoluble particles 22 (i.e., below a temperature threshold at which thermal decomposition occurs). For a majority of suitable latex-based polymer particles, the upper limit of the activation/curing temperature ranges from about 250° C. to about 270° C. Above this temperature threshold, the polymer particles would chemically degrade into volatile species and leave the patterned intermediate part 56, and thus would stop performing their function. As mentioned above, for a majority of water-soluble binders 32, 32', an upper limit on thermal exposure ranges from about 150° C. to about 220° C. Above this temperature the water-soluble binder 32 may chemically degrade into water-insoluble species that could no longer be removed from the build material cake 58 by submersion in water, and thus would inhibit the recycling of unpatterned build material. In other examples, the activation temperature may be greater than the MFFT of the patterning fluid 20. As an example, the activation temperature may range from about 10° C. to about 200° C. As another example, the activation temperature may range from about 11° C. to about 150° C. As still another example, the activation temperature may range from about 25° C. to about 90° C. As still another example, the activation temperature may be about 50° C.

The length of time for which the heat is applied to the patterned intermediate part 56 may be dependent, for example, on one or more of: characteristics of the heat and/or radiation source 26, 26', characteristics of the water-insoluble binder particles 22, characteristics of the metallic particles 30 (e.g., type, particle size, etc.), and/or the characteristics of the sintered part 62 (e.g., wall thickness). The patterned intermediate part 56 may be heated at the activation temperature for an activation/curing time period ranging from about 1 minute to about 360 minutes The rate at which the patterned intermediate part 56 is heated to the activation temperature may depend, in part, on one or more of: the patterning fluid 20 used, the size (i.e., thickness and/or area (across the x-y plane)) of the build material layer(s) 38, and/or the characteristics of the sintered part 62 (e.g., size, wall thickness, etc.). The patterned intermediate part 56 may be heated to the activation temperature at a rate of about 1° C./minute to about 10° C./minute, although it is contemplated that a slower or faster heating rate may be used.

Heating the patterned intermediate part 56 may cause the water-insoluble binder particles 22 to coalesce into a continuous polymer phase or glue 22' among the metallic particles 30 of the patterned intermediate part 56. As mentioned above, the coalescing solvent (when included in the patterning fluid 20) plasticizes the water-insoluble binder particles 22 and enhances the coalescing of the water-insoluble binder particles 22. The continuous polymer phase or glue 22' may act as a heat-activated adhesive between the metallic particles 30 to form the stabilized, cured intermediate part 56'.

Heating the patterned intermediate part 56 to reach the activation temperature to form the cured intermediate part 56' may also result in additional evaporation of the liquid vehicle from the patterned intermediate part 56. The evaporation may result in some densification, through capillary action, of the cured intermediate part 56'.

Whether formed in the layer-by-layer manner, or by activating or curing the intermediate part 56, the stabilized, cured intermediate part 56' exhibits handleable mechanical durability.

Whether formed in the layer-by-layer manner, or by activating or curing the intermediate part 56, the cured intermediate part 56' may then be extracted from the build material cake 58. The cured intermediate part 56' may be extracted by any suitable means.

In an example, the cured intermediate part 56' may be extracted using a wet extraction process. In an example of the method 100, 200, prior to the heating of the cured intermediate part 56' to form the sintered part 62, the method further comprises exposing the cured intermediate part 56' to a wet extraction process to remove any unpatterned metallic particles 30. The cured intermediate part 56' can be removed from the build material cake 58 using a wet extraction process that does not deleteriously affect the structure of the cured intermediate part 56'. The wet extraction process is shown in FIG. 3E.

The metallic particles 30 in the unpatterned portion(s) 42 of the build material cake 58 are loosely held together by the water-soluble binder glue 32'. In contrast, the cured intermediate part 56' contains the activated, water-insoluble binder (i.e., the continuous network or glue 22') that strongly binds together the metallic particles 30. This combination of materials in the build material cake 58 enables the wet extraction process to readily remove the non-patterned metallic particles 30 and leave the cured intermediate part 56' intact. As shown in FIG. 3E, the non-patterned portions 42 of the build material cake 58 (i.e., the metallic particles 30 not bound by the activated, water-insoluble binder/continuous network/glue 22') may be removed from the cured intermediate part 56' by exposure to water.

Water exposure may be accomplished by spraying the build material cake 58 with water using wet extraction tool(s) 66, such as a hose and a sprayer, a spray gun, etc. Water exposure may also be accomplished by sonicating the build material cake 58 in a water bath. Water exposure may also be accomplished by soaking the build material cake 58 in water. In some examples, the water may be heated (e.g., to a temperature ranging from about 22° C. to about 80° C.

Wet extraction of unpatterned metallic particles 30 may be gentler, when compared to dry methods, such as sand blasting, on fine structural features (e.g., sharp angles, surface texture, etc.). Wet extraction results in fewer particles (e.g., metallic particles 30) in the air. Wet extraction also results in the formation of a slurry of the metallic particles 30 and water-soluble binder 32, and this slurry can be recycled back into the build material slurry 16. When the slurry from the wet extraction process is to be recycled into the build material slurry 16, it may be desirable to measure the amount of water 34 used in the wet extraction process so that so that the recycled build material slurry 16 may include an appropriate amount of water 34.

In some examples, the cured intermediate part 56' may be cleaned after extraction to remove any remaining unpatterned metallic particles 30 from its surface. In an example, the cured intermediate part 56' may be cleaned with a brush and/or an air jet.

In some examples, dry extraction of unpatterned metallic particles 30 from the build material cake 58 may be used in place of wet extraction. Vibratory or compressive forces may be applied to the build material cake 58 to facilitate breaking apart of the build material cake 58. Metallic particles 30 from unpatterned regions (e.g., 42 in FIG. 3B) that remain bound to the cured intermediate part 56' may be removed by light bead blasting or cleaning with a brush and/or an air jet.

After the extraction and/or the cleaning of the cured intermediate part 56', the cured intermediate part 56' may be heated to form the sintered part 62. In an example of the method 100, 200, the heating of the cured intermediate part 56' to form the sintered part 62 includes: heating the cured intermediate part 56' to a sintering temperature to form the sintered part 62. This example may be used when the water-insoluble binder becomes part of the final 3D part, and does not need to be removed. For example, when metal nanoparticles are the water-insoluble binder, de-binding may not be a part of the method 100, 200. In another example of the method 100, 200, the heating of the cured intermediate part 56' to form the sintered part 62 includes: heating the cured intermediate part 56' to a thermal decomposition temperature of the water-insoluble binder 22, 22' to create an at least substantially binder-free part 60; and heating the at least substantially binder-free part 60 to a sintering temperature to form the sintered part 62.

When de-binding is utilized, heating to de-bind and heating to sinter take place at two different temperatures, where the temperature for de-binding is lower than the temperature for sintering. Both the de-binding and the sintering heating stages are generally depicted in FIG. 3F, where heat or radiation to generate heat may be applied as denoted by the arrows 64 from the heat source 26'.

Heating to de-bind is accomplished at a thermal decomposition temperature, i.e., a temperature that is sufficient to thermally decompose the water-insoluble binder 22, 22'. As such, the temperature for de-binding depends upon the material of the water-insoluble binder particles 22, 22' of the patterning fluid 20. In an example, the thermal decomposition temperature ranges from about 250° C. to about 600° C. In another example, the thermal decomposition temperature ranges from about 280° C. to about 600° C., or to about 500° C. The water-insoluble binder 22, 22' may have a clean thermal decomposition mechanism (e.g., leaves <5 wt % solid residue of the initial binder 22, 22', and in some instances <1 wt % solid residue of the initial binder 22, 22'). The smaller residue percentage (e.g., close to 0%) is more desirable. During the de-binding stage, the water-insoluble binder 22, 22' may decompose first into shorter molecular fragments, which turn into a liquid phase of lower viscosity or the water-insoluble binder 22, 22' may decompose into the liquid phase of lower viscosity. Capillary pressure developing during evaporation of this liquid pulls the metallic particles 30 together leading to further densification and formation of the at least substantially binder-free part 60.

While not being bound to any theory, it is believed that the at least substantially binder-free part 60 may maintain its shape due, for example, to one or more of: i) the low amount of stress experienced by the at least substantially binder-free part 60 due to it not being physically handled, ii) low level necking occurring between the metallic particles 30 at the thermal decomposition temperature of the water-insoluble binder 22, 22', and/or iii) oxygen mediated bonding between metal particles. The at least substantially binder-free part 60 may maintain its shape although the water-insoluble binder 22, 22' is at least substantially removed and the metallic particles 30 are not yet sintered. Heating to form the substantially binder-free part 60 may begin the initial stages of sintering, which can result in the formation of weak bonds that are strengthened during final sintering.

Heating to sinter is accomplished at a sintering temperature that is sufficient to sinter the remaining metallic particles 30. The sintering temperature is highly depending upon the composition of the metallic particles 30. During heating/sintering, the at least substantially binder-free part 60 or the cure intermediate part 58' (including a water-insoluble binder that is not removed) may be heated to a sintering temperature ranging from about 80% to about 99.9% of the melting point or the solidus, eutectic, or peritectic temperature of the metallic particles 30. In another example, the at least substantially binder-free part 60 or the cure intermediate part 58' (including a water-insoluble binder that is not removed) may be heated to a sintering temperature ranging from about 90% to about 95% of the melting point or the solidus, eutectic, or peritectic temperature of the metallic particles 30. In still another example, the at least substantially binder-free part 60 or the cure intermediate part 58' (including a water-insoluble binder that is not removed) may be heated to a sintering temperature ranging from about 60% to about 90% of the melting point or the solidus, eutectic, or peritectic temperature of the metallic particles 30. In yet another example, the sintering temperature may range from about 10° C. below the melting temperature (e.g., the solidus temperature) of the metallic particles 30 to about 50° C. below the melting temperature of the metallic particles 30. In yet another example, the sintering temperature may range from about 100° C. below the melting temperature (e.g., the solidus temperature) of the metallic particles 30 to about 200° C. below the melting temperature of the metallic particles 30.

The sintering temperature may also depend upon the particle size and time for sintering (i.e., high temperature exposure time). As an example, the sintering temperature may range from about 450° C. to about 1800° C. In another example, the sintering temperature is at least 900° C. An example of a sintering temperature for bronze is about 850° C., an example sintering temperature for copper is 1000° C., and an example of a sintering temperature for stainless steel ranges from about 1000° C. to about 1450° C., and an example of a sintering temperature for aluminum alloys ranges from about 450° C. to about 600° C. While these temperatures are provided as sintering temperature examples, it is to be understood that the sintering heating temperature depends upon the metallic particles 30 that are utilized, and may be higher or lower than the provided examples.

Heating at a suitable temperature sinters and fuses the metallic particles 30 to form the sintered part 62, which may be even further densified relative to the at least substantially binder-free part 60. For example, as a result of sintering, the density may go from 50% density to over 90%, and in some cases very close to 100% of the theoretical density.

The length of time at which the heat (for each of de-binding and sintering) is applied and the rate at which the part 56', 60 is heated may be dependent, for example, on one or more of: characteristics of the heat source 26', characteristics of the water-insoluble binder particles 22, 22', characteristics of the metallic particles 30 (e.g., type, particle size, etc.), and/or the characteristics of the sintered part 62 (e.g., wall thickness).

The cured intermediate part 56' may be heated at the thermal decomposition temperature for a thermal decomposition time period ranging from about 10 minutes to about 12 hours. The cured intermediate part 56' may be heated to the thermal decomposition temperature at a rate ranging from about 0.5° C./minute to about 20° C./minute. The heating rate may depend, in part, on one or more of: the amount of the water-insoluble binder 22, 22' in the cured intermediate part 56', the porosity of the cured intermediate part 56', and/or the characteristics of the cured intermediate part 56'/sintered part 62 (e.g., size, wall thickness, etc.).

The at least substantially binder-free part 60 may be heated at the sintering temperature for a sintering time period ranging from about 20 minutes to about 15 hours. The at least substantially binder-free part 60 may be heated to the sintering temperature at a rate ranging from about 1° C./minute to about 20° C./minute. A high ramp rate up to the sintering temperature may be desirable to produce a more favorable grain structure or microstructure. However, in some instances, slower ramp rates may be desirable.

In some examples of the method 100, 200, the heat for each of de-binding (i.e., heating of the cured intermediate part 56' to the thermal decomposition temperature) and sintering (i.e., heating of the at least substantially binder-free part 60 to the sintering temperature) is applied in an environment containing an inert gas, a low reactivity gas, a reducing gas, or a combination thereof. In other words, the heating of the cured intermediate part 56' to the thermal decomposition temperature and the heating of the at least substantially binder-free part 60 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the water-insoluble binder continuous network 22' thermally decomposes rather than undergoing an alternate reaction which would fail to produce the at least substantially binder-free part 60 and/or to prevent the oxidation of the metallic particles 30. The sintering may be accomplished in an environment containing an inert gas, a low reactivity gas, and/or a reducing gas so that the metallic particles 30 will sinter rather than undergoing an alternate reaction (e.g., an oxidation reaction) which would fail to produce the sintered part 62. Examples of inert gas include argon gas, helium gas, etc. An example of a low reactivity gas includes nitrogen gas, and examples of reducing gases include hydrogen gas, carbon monoxide gas, etc.

In other examples of the method 100, 200, the heat (for each of de-binding and sintering) may be applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the metallic particles 30 during de-binding and sintering. An example of the carbon that may be placed in the heating environment includes graphite rods. In other examples, a graphite furnace may be used.

In still other examples of the method 100, 200, the heat (for each of de-binding and sintering) is applied in a low gas pressure or vacuum environment. The de-binding and the sintering may be accomplished in a low gas pressure or vacuum environment so that the water-insoluble binder continuous network 22' thermally decomposes and/or to prevent the oxidation of the metallic particles 30. Moreover, sintering at the low gas pressure or under vacuum may allow for more complete or faster pore collapse, and thus higher density parts. However, vacuum may not be used during sintering when the metallic particles 30 (e.g., Cr) are capable of evaporating in such conditions. In an example, the low pressure environment is at a pressure ranging from about 1E-5 torr ($1*10^{-5}$ torr) to about 10 torr.

In yet other examples of the method 100, 200, the heat (for each of de-binding and sintering) may be applied in any environment, including an environment that contains oxygen. In these examples, the metallic particles 30 may have a low reactivity with or may react with oxygen to produce a metal oxide coating on the particles that can be later transformed to zero valent metal by heating in a reducing ambient (e.g., hydrogen or a nitrogen-hydrogen mixture). Examples of metallic particles 30 that may have a low reactivity include silver (Ag), gold (Au), and platinum (Pt).

Figure 4:
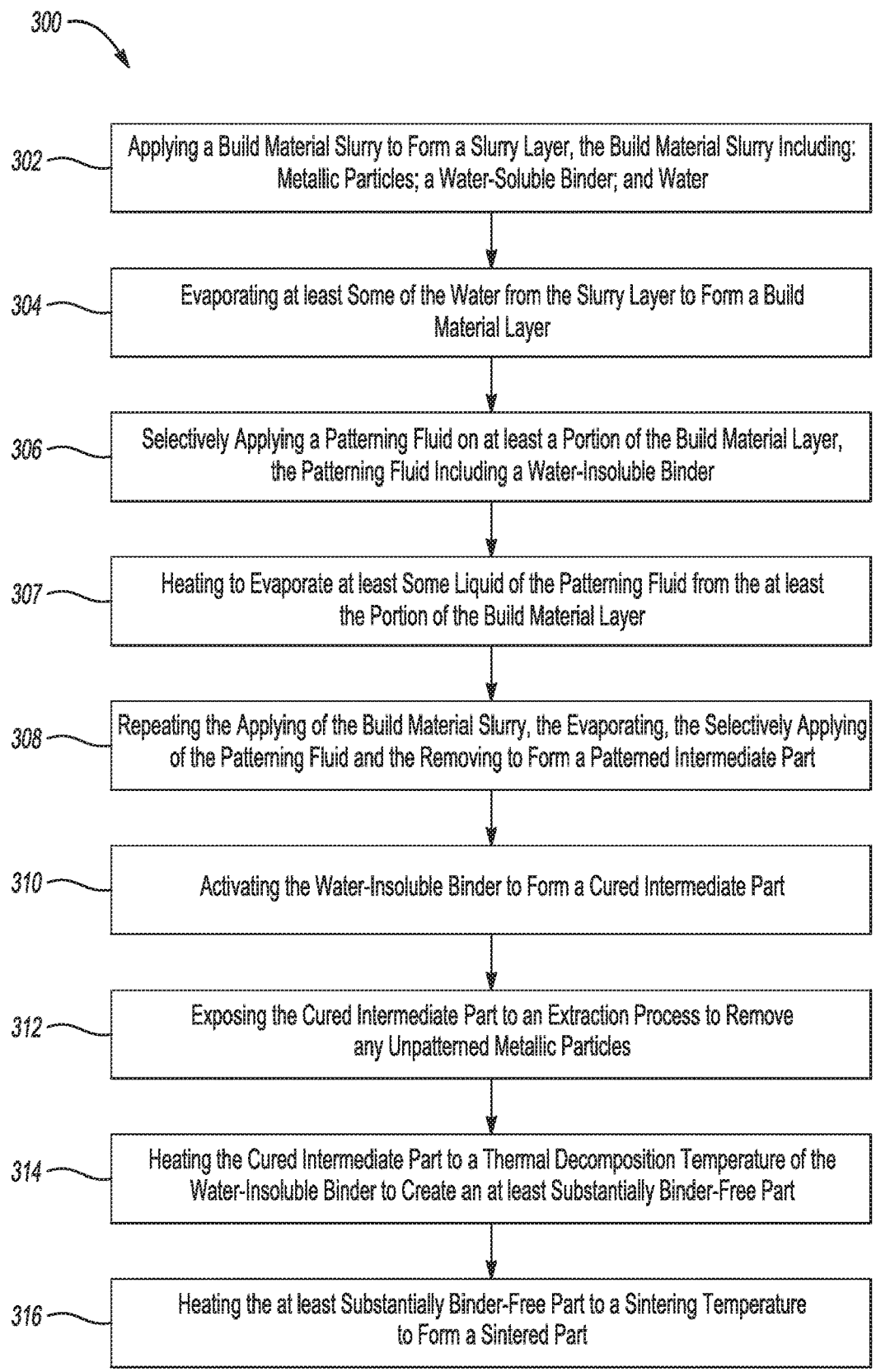
FIG. 4 is a flow diagram illustrating an example of another method for 3D printing disclosed herein.

As shown in FIG. 4, one example of the method 300 for three-dimensional (3D) printing, comprises: applying a build material slurry 16 to form a slurry layer 36, the build material slurry 16 including: metallic particles 30; a water-soluble binder 32; and water 34 (reference numeral 302); evaporating at least some of the water 34 from the slurry layer 36 to form a build material layer 38 (reference numeral 304); selectively applying a patterning fluid 20 on at least a portion 40 of the build material layer 38, the patterning fluid 20 including a water-insoluble binder 22 (reference numeral 306); heating to evaporate at least some liquid of the patterning fluid from the at least the portion of the build material layer 38 (reference numeral 307); repeating the applying of the build material slurry 16, the evaporating, the selectively applying of the patterning fluid 20, and the removing to form a patterned intermediate part 56 (reference numeral 308); activating the water-insoluble binder 22 to form a cured intermediate part 56' (reference numeral 310); exposing the cured intermediate part 56' to an extraction process to remove any unpatterned metallic particles 30 (reference numeral 312); heating the cured intermediate part 56' to a thermal decomposition temperature of the water-insoluble binder 22, 22' to create an at least substantially binder-free part 60 (reference numeral 314); and heating the at least substantially binder-free part 60 to a sintering temperature to form the sintered part 62 (reference numeral 316).

To further illustrate the present disclosure, examples are given herein. It is to be understood these examples are provided for illustrative purposes and are not to be construed as limiting the scope of the present disclosure.

EXAMPLES

Example 1

Three examples of the build material slurry were prepared (labeled "example build material slurry 1," "example build material slurry 2", and "example build material slurry 3"). Each example build material slurry included polyvinyl alcohol (PVA) as the water-soluble binder and stainless steel metal injection molding (MIM) powder as the metallic particles. The stainless steel MIM powder (available from Carpenter Technology Corp. as 17-4 PH stainless steel) had a D90 particle size distribution of about 16 μm (i.e., where 10% the population is above 16 μm and 90 is below 16 μm). Each example build material slurry was prepared in a small glass container by first dissolving 2.5 wt % PVA in water at about 80° C. The stainless steel MIM powder was added to the PVA solution at a weight ratio of 10 parts metal to 1 part PVA solution. Then, additional water was added to decrease the viscosity of the example build material slurries. The general formulation of each of the example build material slurries is shown in Table 1, with the amount in grams (g) of each component that was used.

TABLE 1

| Ingredient | Specific component | Example build material slurry 1 (g) | Example build material slurry 2 (g) | Example build material slurry 3 (g) |
| --- | --- | --- | --- | --- |
| Water-soluble binder solution | Polyvinyl alcohol (PVA) | 0.5 | 1.0 | 1.0 |
| Metallic particles | Stainless steel MIM powder | 5 | 10 | 10 |
| Additional water | | 0.2 | 0.4 | 0.4 |

The example build material slurries were used to form films on glass or silicon (Si), 50 mm by 75 mm, substrates by depositing several drops of slurry at one end of the slide and then sweeping a doctor blade across the substrate at a speed of about 5-7 cm/s to spread the example build material slurries. The films were dried by placing the substrates on a 80° C. hot plate for about 1 minute. The layer thickness was adjusted by the gap between the doctor blade and the substrate. To measure the thickness control and uniformity of the films, each film was cut along the middle (i.e., a cut parallel to the x-axis in a x-y plane, and having about equal amounts of the film on each side of the cut), then the thickness of each film was measured at three locations along the cut, near one edge of the film (labeled "T1"), in the middle of the film (labeled "T2"), and near the other edge of the film (labeled "T3"). The thicknesses were measured by a Keyence laser confocal microscope or a Dektak profilometer. For each film, the example build material slurry used, the gap (in μm) between the doctor blade and the substrate, and the thickness measurement (in μm) at each of T1, T2, and T3 are shown in Table 2.

TABLE 2

| | Slurry | Gap (μm) | T1 (μm) | T2 (μm) | T3 (μm) |
|---|---|---|---|---|---|
| Film 1 | Example build material slurry 1 | 200 | 75 | 71 | 64 |
| Film 2 | Example build material slurry 1 | 200 | 71 | 72 | 67 |
| Film 3 | Example build material slurry 2 | 300 | 160 | 172 | 165 |
| Film 4 | Example build material slurry 2 | 200 | 114 | 110 | 102 |
| Film 5 | Example build material slurry 2 | 4 × 100 | 428 | 441 | 435 |
| Film 6 | Example build material slurry 3 | 200 | 113 | 115 | 111 |
| Film 7 | Example build material slurry 3 | 3 × 100 | 342 | 352 | 341 |

As shown in Table 2, the layer thickness is reproducible and substantially uniform across the substrate. The difference between the gap and the layer thickness was due to the densification of the layer as the water evaporated. Film 5 was created by spreading four 100 μm layers (denoted by "4×100" in Table 2) on top of each other with a 1 minute bake at 80° C. after the application of each layer. Similarly, film 7 was created by spreading three 100 μm layers (denoted by "3×100" in Table 2) on top of each other with a 1 minute bake at 80° C. after the application of each layer. Films 5 and 7 demonstrate multilayer capability (i.e., that substantially uniform layers can be successfully spread on top of one another).

Figure 5:
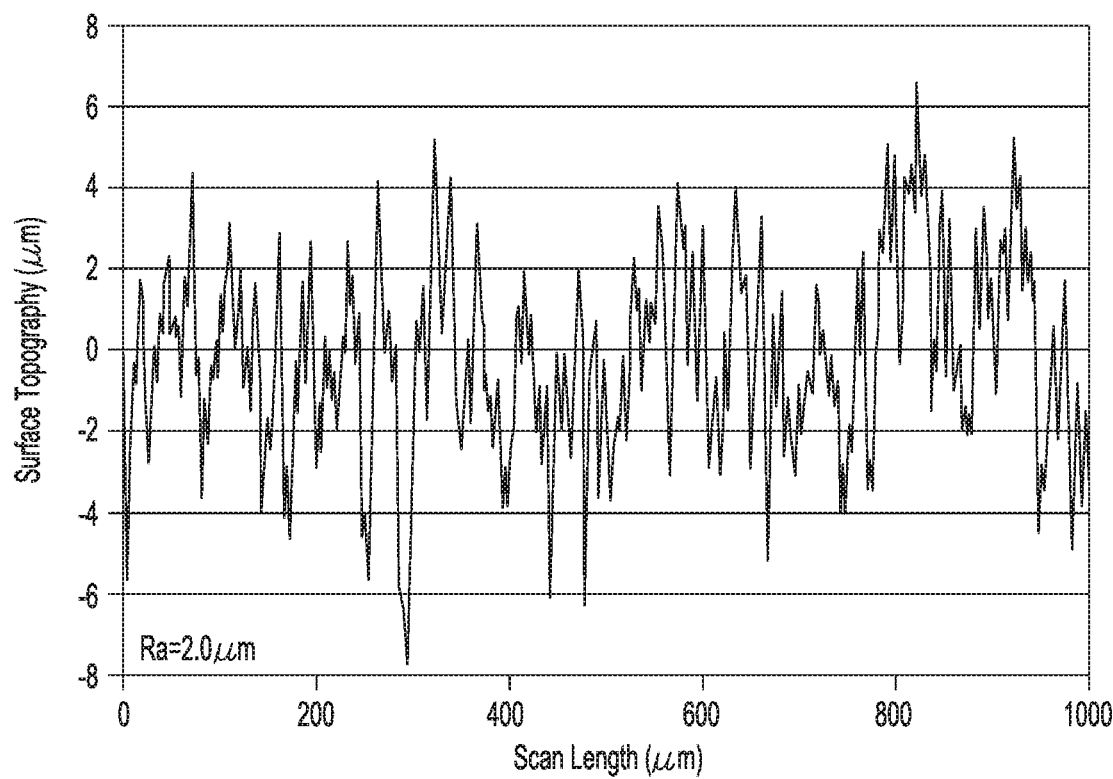
FIG. 5 is a graph of the surface roughness of an example build material layer as measured by a Dektak profilometer, with surface topography in microns (μm) shown on the y-axis and scan length in μm shown on the x-axis.

The surface roughness of film 5 was measured by both the Keyence laser confocal microscope and the Dektak profilometer to be about 2 μm. FIG. 5 shows a graph of the surface roughness of film 5 as measured by the Dektak profilometer, with surface topography in μm shown on the y-axis and scan length in μm shown on the x-axis. The surface roughness of film 5 shows that the example build material layers (i.e., films) formed from the example build material slurries are smooth and free of large surface defects.

Example 2

The packing fraction of build material layers was measured by weighing dried films of known dimensions (1.5 cm×1.8 cm) patterned from the slurry build layers of Film 5 in Table 2. The weight of the patterned films was divided by the volume of the patterned area to get an apparent density in g/cm³, which was divided by the density of 17-4PH stainless steel to get a packing fraction. The packing fraction of the dried slurry layers was 0.57, which is significantly better than the packing fraction of less than 0.45 expected from spreading dry stainless steel MIM powder.

Example 3

Another example build material slurry (labeled "example build material slurry 4") was prepared. Example build material slurry 4 included polyvinyl alcohol (PVA) as the water-soluble binder and copper (Cu) powder as the metallic particles. The copper powder (available from Goodfellow) had an average particle size of about 10 μm. The copper slurry was prepared by mixing 6.1 g of copper powder, 0.5 g of 2.5 wt % PVA in water, and 0.2 g of water.

Figure 6:
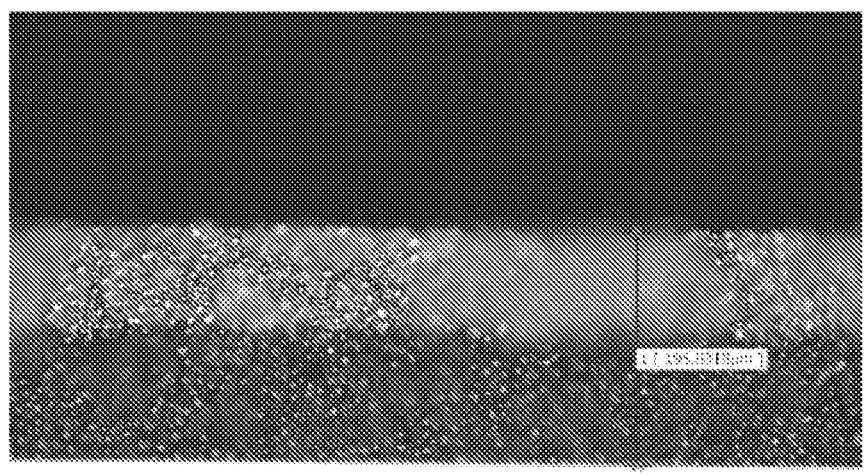
FIG. 6 is a black and white photograph showing a cross-section of two example build material layers.

An about 100 μm thick example build material layer was formed from example build material slurry 4 on a silicon substrate using the doctor blade. The example build material layer was dried by placing the substrate on an 80° C. hot plate for about 1 minute. Then another example build material layer, having a thickness of about 100 μm, was formed from example build material slurry 1 (described in Example 1) on top of the first build material layer using the doctor blade. FIG. 6 is a black and white photograph showing a cross-section of the two example build material layers. As shown in FIG. 6, there is a sharp interface present between the two example build material layers, which indicates little or no intermixing of the two example build material layers.

It is to be understood that the ranges provided herein include the stated range and any value or sub-range within the stated range. For example, a range from about 0.01 wt % up to 1 wt % should be interpreted to include not only the explicitly recited limits of from about 0.01 wt % up to 1 wt %, but also to include individual values, such as 0.11 wt %, 0.5 wt %, 0.785 wt %, 0.8 wt %, 0.95 wt %, etc., and sub-ranges, such as from about 0.01 wt % to about 0.85 wt %, from about 0.05 wt % to about 0.75 wt %, from about 0.25 wt % to about 0.8 wt %, etc. Furthermore, when "about" is utilized to describe a value, this is meant to encompass minor variations (up to +/−15%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
depositing and spreading a build material slurry to form a slurry layer, the build material slurry including:
metallic particles, wherein an individual particle size of the metallic particles ranges from about 10 μm to about 20 μm;

a water-soluble binder selected from the group consisting of polyacrylates, sugars, starches, sugar alcohols, polymeric sugars, oligomeric sugars, polycarboxylic acids, polysulfonic acids, water-soluble polymers containing carboxylic moieties, water-soluble polymers containing sulfonic moieties, polyethers, polyvinylpyrrolidone, polyether alkoxy silane, polyethylene glycol, polyethylene oxide, polyamines, polyethyleneimines, polyamidoamines, and combinations thereof; and water;

evaporating at least some of the water from the slurry layer by heating the slurry layer to form a build material layer having the metallic particles bound within the build material layer by the water-soluble binder; and selectively applying a patterning fluid on at least a portion of the build material layer, the patterning fluid including a water-insoluble binder;

wherein the depositing of the build material slurry is accomplished using a build material distributor selected from the group consisting of a slot die coater, a rod coater, a blade coater, a fountain curtain coater, and combinations thereof;

and wherein the spreading of the build material slurry is accomplished using the build material distributor selected from the group consisting of a doctor blade, a slot die coater, a rod coater, a blade coater, a fountain curtain coater, a roller, and combinations thereof.

2. The method as defined in claim 1, further comprising:
removing at least some liquid of the patterning fluid from the at least the portion of the build material layer; and
activating the water-insoluble binder in the at least the portion of the build material layer.

3. The method as defined in claim 2, further comprising:
repeating the depositing and spreading of the build material slurry, the evaporating, the selectively applying of the patterning fluid, the removing, and the activating to form a cured intermediate part; and
heating the cured intermediate part to form a sintered part.

4. The method as defined in claim 3 wherein prior to the heating of the cured intermediate part to form the sintered part, the method further comprises exposing the cured intermediate part to an extraction process to remove any unpatterned metallic particles.

5. The method as defined in claim 3 wherein the heating of the cured intermediate part to form the sintered part includes:
heating the cured intermediate part to a thermal decomposition temperature of the water-insoluble binder to create an at least substantially binder-free part; and
heating the at least substantially binder-free part to a sintering temperature to form the sintered part.

6. The method as defined in claim 1, further comprising:
removing at least some liquid of the patterning fluid from the at least the portion of the build material layer;
then repeating the depositing and spreading of the build material slurry, the evaporating, the selectively applying of the patterning fluid, and the removing, to form an intermediate part;
activating the water-insoluble binder in the intermediate part to form a cured intermediate part; and
heating the cured intermediate part to form a sintered part.

7. The method as defined in claim 1 wherein the build material layer has a thickness ranging from about 30 μm to about 150 μm.

8. The method as defined in claim 1 wherein the metallic particles are present in the build material slurry in an amount ranging from about 50 wt % to about 97 wt %, based on a total weight of the build material slurry.

9. A method for three-dimensional (3D) printing, comprising:
depositing and spreading a build material slurry to form a slurry layer, the build material slurry including:
metallic particles, wherein an individual particle size of the metallic particles ranges from about 10 μm to about 20 μm;
a water-soluble binder selected from the group consisting of polyacrylates, sugars, starches, sugar alcohols, polymeric sugars, oligomeric sugars, polycarboxylic acids, polysulfonic acids, water-soluble polymers containing carboxylic moieties, water-soluble polymers containing sulfonic moieties, polyethers, polyvinylpyrrolidone, polyether alkoxy silane, polyethylene glycol, polyethylene oxide, polyamines, polyethyleneimines, polyamidoamines, and combinations thereof; and
water;
evaporating at least some of the water from the slurry layer by heating the slurry layer to form a build material layer having the metallic particles bound within the build material layer by the water-soluble binder;
selectively applying a patterning fluid on at least a portion of the build material layer, the patterning fluid including a water-insoluble binder;
heating to evaporate at least some liquid of the patterning fluid from the at least the portion of the build material layer;
repeating the applying of the build material slurry, the evaporating, the selectively applying of the patterning fluid, and the removing to form a patterned intermediate part;
activating the water-insoluble binder to form a cured intermediate part;
exposing the cured intermediate part to a extraction process to remove any unpatterned metallic particles;
heating the cured intermediate part to a thermal decomposition temperature of the water-insoluble binder to create an at least substantially binder-free part; and
heating the at least substantially binder-free part to a sintering temperature to form the sintered part;
wherein the depositing of the build material slurry is accomplished using a build material distributor selected from the group consisting of a slot die coater, a rod coater, a blade coater, a fountain curtain coater, and combinations thereof;
and wherein the spreading of the build material slurry is accomplished using the build material distributor selected from the group consisting of a doctor blade, a slot die coater, a rod coater, a blade coater, a fountain curtain coater, a roller, and combinations thereof.

* * * * *